US011212701B2

(12) United States Patent
Tseng et al.

(10) Patent No.: US 11,212,701 B2
(45) Date of Patent: Dec. 28, 2021

(54) SYSTEMS, METHODS, AND DEVICES FOR ULTRA-RELIABLE LOW LATENCY COMMUNICATION QUALITY-OF-SERVICE GUARANTEE

(71) Applicant: FG Innovation Company Limited, Tuen Mun (HK)

(72) Inventors: Yung-Lan Tseng, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 93 days.

(21) Appl. No.: 15/978,532

(22) Filed: May 14, 2018

(65) Prior Publication Data

US 2018/0332501 A1 Nov. 15, 2018

Related U.S. Application Data

(60) Provisional application No. 62/505,946, filed on May 14, 2017.

(51) Int. Cl.
*H04W 28/06* (2009.01)
*H04L 1/18* (2006.01)
(Continued)

(52) U.S. Cl.
CPC .............. *H04W 28/06* (2013.01); *H04L 1/08* (2013.01); *H04L 1/188* (2013.01); *H04L 1/189* (2013.01);
(Continued)

(58) Field of Classification Search
CPC ..... H04W 76/15; H04W 80/02; H04W 76/27; H04W 12/02; H04W 28/06; H04W 28/065; H04W 36/0066; H04W 76/19; H04W 76/28; H04W 12/00; H04W 28/0278; H04W 36/08; H04W 72/04; H04W 72/14; H04W 76/10; H04W 76/12; H04W 80/00; H04W 12/001; H04W 12/10; H04W 24/04; H04W 28/04; H04W 36/0055; H04W 36/30; H04W 36/305; H04W 4/70; H04W 72/042; H04W 72/048; H04W 72/1242; H04W 72/1289; H04W 74/006; H04W 74/08; H04W 76/00; H04W 76/11; H04W 76/18; H04W 76/25; H04W 76/32; H04W 80/08; H04W 8/30; H04L 1/08; H04L 5/001; H04L 5/0098; H04L 1/1812;
(Continued)

(56) References Cited

U.S. PATENT DOCUMENTS

| 2018/0279262 | A1* | 9/2018 | Babaei | H04L 1/00 |
| 2018/0310202 | A1* | 10/2018 | Lohr | H04W 28/065 |
| 2019/0239279 | A1* | 8/2019 | Shi | H04L 1/18 |

* cited by examiner

*Primary Examiner* — Yemane Mesfin
*Assistant Examiner* — Mon Cheri S Davenport
(74) *Attorney, Agent, or Firm* — ScienBizip, P.C.

(57) ABSTRACT

A method for packet data convergence protocol (PDCP) protocol data unit (PDU) duplication and transport block (TB) repetition is provided. The method includes providing a radio access network (RAN) configuration having at least one of a PDCP PDU duplication configuration or a TB repetition configuration, performing at least one of PDCP PDU duplication or TB repetition based on one or more triggering events in the RAN configuration, where the PDCP PDU duplication includes providing at least one duplicated PDCP PDU to a radio link control (RLC) bearer.

16 Claims, 18 Drawing Sheets

(51) Int. Cl.
*H04W 76/10* (2018.01)
*H04L 1/08* (2006.01)

(52) U.S. Cl.
CPC .......... *H04L 1/1825* (2013.01); *H04L 1/1864* (2013.01); *H04W 76/10* (2018.02); *H04L 1/1812* (2013.01)

(58) Field of Classification Search
CPC ....... H04L 1/1874; H04L 1/189; H04L 49/90; H04L 69/04; H04L 1/1848; H04L 1/1809; H04L 1/1822; H04L 1/1825; H04L 1/1835; H04L 1/1864; H04L 1/188; H04L 5/0053; H04L 5/0055
See application file for complete search history.

Configuration of PDCP PDU duplication if PDCP PDU size is larger than $S_{act\_Ax}$

| Duplication Configuration of E#A-x1 | CC index for duplicated bearer #1 (00) |
| Duplication Configuration of E#A-x2 | CC index for duplicated bearer #1 (00) |

| CC index for duplicated bearer #2 (01) | CC index for duplicated bearer #2 (00) |
| CC index for duplicated bearer #3 (01) | CC index for duplicated bearer #3 (01) |
| CC index for duplicated bearer #4 (10) | CC index for duplicated bearer #4 (00) |
| CC index for duplicated bearer #5 (10) | CC index for duplicated bearer #5 (01) |

SYSTEMS, METHODS, AND DEVICES FOR ULTRA-RELIABLE LOW LATENCY COMMUNICATION QUALITY-OF-SERVICE GUARANTEE

CROSS-REFERENCE TO RELATED APPLICATION(S)

The present application claims the benefit of and priority to a provisional U.S. Patent Application Ser. No. 62/505,946 filed May 14, 2017, entitled "METHODS FOR ULTRA-RELIABLE LOW LATENCY COMMUNICATION QUALITY-OF-SERVICE GUARANTEE," (hereinafter referred to as "US62239 application"). The disclosure of the US62239 application is hereby incorporated fully by reference into the present application.

TECHNICAL FIELD

The present disclosure generally relates to wireless communication systems, devices, and methods, and more particularly, to wireless communication systems, devices, and methods to guarantee the quality-of-service (QoS) of ultra-reliable and low-latency communications (URLLC) for the next generation wireless communication networks.

BACKGROUND

Various efforts have been made to improve the performances of wireless communications, such as data rate, latency, reliability, mobility and etc., for the next generation wireless communication networks. Among the goals, the next generation wireless communication networks are expected to provide high reliability for URLLC service while under strict latency requirements.

Although the 3rd Generation Partnership Project (3GPP) has proposed using packet data convergence protocol (PDCP) protocol data unit (PDU) duplication and transport block (TB) repetition to improve the QoS of URLLC, the details on how to apply the duplication and repetition to guarantee the high reliability requirement of URLLC have not been discussed. However, it should be agreed that unrestricted usage of PDCP PDU duplication and/or TB repetition would consume both radio and network resources.

Thus, there are needs in the art for efficient systems, devices, and methods for guaranteeing the QoS of URLLC using PDCP PDU duplication and/or TB repetition.

SUMMARY

The present disclosure is directed to systems, methods, and devices for URLLC QoS guarantee using PDCP PDU duplication and/or TB repetition.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 17 is a diagram illustrating an exemplary Duplication configuration in the downlink control signaling, according to an exemplary implementation of the present application.

DETAILED DESCRIPTION

Figure 1:
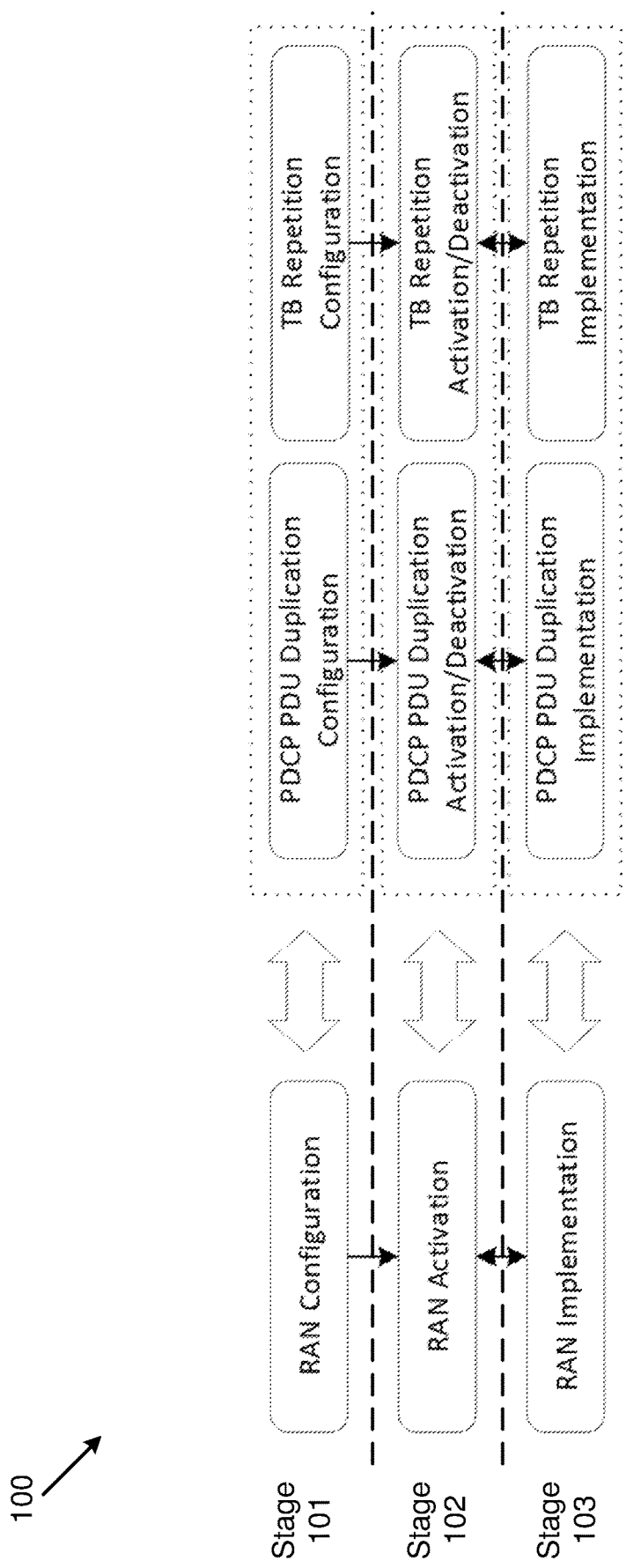
FIG. 1 is a block diagram of a three-stage control scheme for the configuration, activation and deactivation of PDCP PDU duplication (hereinafter "Duplication") and/or TB repetition (hereinafter "Repetition") in a radio access network (RAN), according to an exemplary implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internes), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

FIG. 1 is a block diagram of a three-stage control scheme for the configuration, activation and deactivation of PDCP PDU duplication (hereinafter "Duplication") and/or TB repetition (hereinafter "Repetition") in a radio access network (RAN), according to an exemplary implementation of the present application. As shown in FIG. 1, a three-stage control scheme 100 includes Stage 101 for RAN configuration, Stage 102 for RAN activation, and Stage 103 for RAN implementation. It should be noted that although FIG. 1 shows a three-stage control scheme based on uplink (UL) operations, the control schemes according to implementations of the present application are not limited to UL operations. That is, the three-stage control scheme 100 according to implementations of the present application may apply to downlink (DL) operations and sidelink (SL) operations as well.

As shown in FIG. 1, a RAN may provide Duplication and/or Repetition configurations to a UE at the RAN Configuration Stage (e.g., Stage 101). A base station (e.g., a gNB) may provide Duplication and/or Repetition configurations when the RAN is building a radio bearer (RB) to provide a service to the UE. The base station may also dynamically re-configure the Duplication and/or Repetition configurations while the service is ongoing. In addition, the base station may also re-configure the Duplication and/or Repetition configurations when there is a change in multi-connectivity configuration, such as the release, modification and addition of one or more secondary cell groups. It should be noted that the Duplication and/or Repetition configurations may be valid within the coverage of the serving cell(s) (or the base station(s)). The RAN may need to deliver new Duplication and/or Repetition configurations to the UE when there is a change in the master base station (e.g., a master gNB) and/or the secondary base stations (e.g., secondary gNBs). In some implementations, the UE may automatically release the Duplication and/or Repetition configurations when there is a change in the master base station and/or the secondary base stations.

As shown in FIG. 1, a RAN may activate and deactivate Duplication and/or Repetition at the RAN Activation Stage (e.g., Stage 102). A UE may also activate and deactivate Duplication and/or Repetition at the RAN Activation Stage. In some implementations, a base station (e.g., a gNB) may activate and deactivate the Duplication and/or Repetition through dedicated signaling, for example, through radio resource control (RRC) control signaling or medium access control (MAC) control element (CE) signaling. In some other implementations, the base station may configure activation and deactivation events at the RAN Configuration Stage (e.g., Stage 101), such that the UE may activate and deactivate Duplication and/or Repetition based on the activation and deactivation events without requiring the RAN to provide dedicated signaling.

As further shown in FIG. 1, at the RAN Implementation Stage (e.g., Stage 103), a UE may realize that Duplication and/or Repetition have been activated, and may be prepared to transmit/receive duplicated PDCP PDUs in the PDCP layer and/or repeated TBs in the PHY layer, respectively.

Although a RAN may activate and deactivate Duplication and/or Repetition at the RAN Activation Stage through dedicated signaling, the dedicated signaling activation approach may take longer for Duplication and/or Repetition to take effect than the event based activation approach. For example, the base station may send dedicated signaling after it realizes that the URLLC packet delivery status has already deteriorated. Thus, there will be time delays before the RAN can take steps to restore service reliability through dedicated signaling. In addition, the dedicated signaling activation approach may incur additional time delays as the UE may need to activate Duplication and/or Repetition after receiving the dedicated signaling from the base station.

Also, the URLLC packet size (e.g., PDCP PDU size in the PDCP layer) may impact the latency and reliability of the URLLC service. Under the same latency requirement, the PDCP PDU size may affect the reliability and latency for several reasons. For URLLC PDCP PDUs, a large PDCP PDU may be segmented into multiple TBs in the lower layer. The latency of a URLLC transmission may be increased when a URLLC PDCP PDU is segmented to multiple TBs because the receiver needs to receive every TB successfully to recover the entire PDCP PDU. In an air link, each TB may be delivered using Repetition, and so HARQ may be implemented to every repeated TB. Moreover, a UE can transmit at most one TB per UL HARQ process per transmission time interval (TTI). Thus, the latency of a URLLC transmission may be increased even under good channel conditions, when the PDCP PDU is segmented into several small TBs. In contrast, when the channel condition is poor, a smaller TB would have higher probability to be transmitted successfully than a large TB would. So, under poor channel condition, the packet error rate and therefore latency would also be increased when the radio link control (RLC) does not apply segmentation or the RLC PDU size is large. Thus, large URLLC packets may require more duplicated bearers to prevent data loss during transmission. In comparison, the reliability of small URLLC packets may be easier to achieve because they require fewer duplicated bearers. In general, it may be more effective to use duplicated bearers to transmit large URLLC packets to ensure service reliability.

In addition to the packet size in the PDCP layer, the TB size in the physical (PHY) layer may also affect the configuration of Repetition. For large TB transmission, it may be more efficient for the base station to allocate dedicated radio resources dynamically for the UE to deliver a large TB rather than configuring the UE to transmit a large TB K times repeatedly since large TBs are more vulnerable to varying channel conditions. In comparison, a small TB may be more suitable to be transmitted repeatedly to compensate the varying channel conditions.

Implementations of the present application describe event-based activation and deactivation processes for PDCP PDU Duplication and TB Repetition to ensure URLLC service reliability. Although the event-based activation and deactivation processes are described in the context of UL operations, by way of example, it should be understood implementations of the present application are not limited to UL operations, as they can be also applied to DL operations and SL operations. It is also noted that implementations of the present application can be applied to both data radio bearers (DRBs) and signaling radio bearers (SRBs). Moreover, the event-based activation and deactivation processes for Duplication and Repetition, according to implementations of the present application, are not limited to only guaranteeing URLLC service reliability, as they may be applied to other types of services, such as enhanced mobile broadband (eMBB) and massive machine-type communication (mMTC) services.

Figure 2:
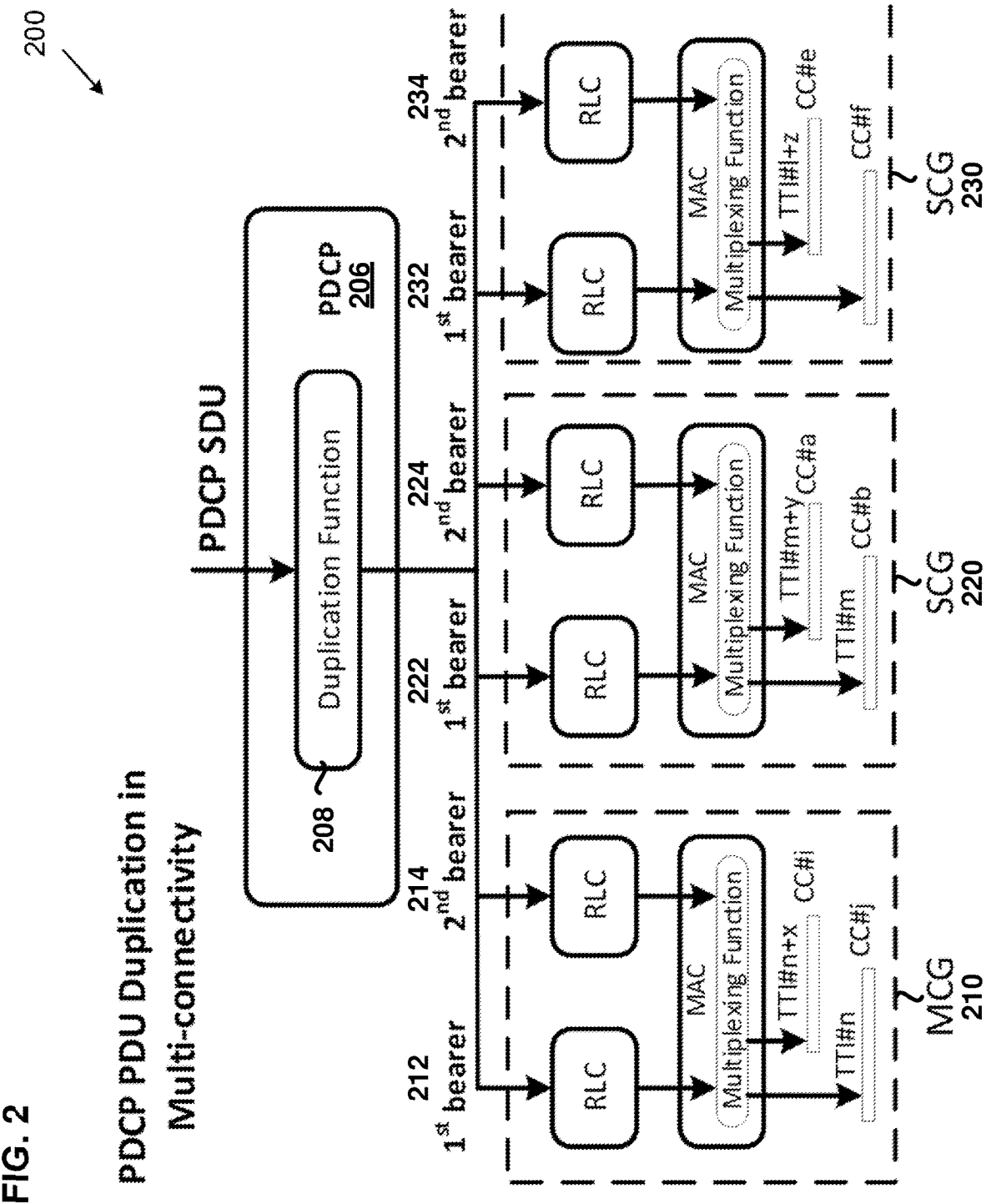
FIG. 2 is a schematic diagram illustrating a multi-connectivity Duplication process, according to an exemplary implementation of the present application.

FIG. 2 is a schematic diagram illustrating a multi-connectivity PDCP PDU Duplication process, according to an exemplary implementation of the present application. In a diagram 200 of FIG. 2, when Duplication is activated based on a specific event (e.g., an event-based Duplication activation), a duplication function 208 in a PDCP layer 206 may duplicate PDCP PDUs and provide them to multiple radio bearers. In the present implementation, the duplicated PDCP PDUs are sent to one or more bearers (e.g., bearers 212 and 214) in the master cell group (MCG) 210, one or more bearers (e.g., bearers 222 and 224) in a secondary cell group 220, and one or more bearers in another secondary cell group 230. After multiplexing in the MAC layers of the corresponding MCG 210, SCG 220, and SCG 230, the duplicated packets are sent through multiple component carriers (CCs) of the multiple cell groups. These duplicated bearers may be configured with the configuration of data radio bearers (DRBs) or signaling radio bearers (SRBs). The present implementation provides a multi-connectivity solution to the Duplication process. In the present implementation, the Duplication with multi-connectivity is supported in both control plane and user plane transmissions.

In another implementation, the duplicated PDCP PDUs are sent to a first bearer 212 and a second bearer 214 in the MCG 210, where after multiplexing in the MAC layer of the MCG 210, the duplicated packets are sent through different component carriers (e.g., CC #i and CC #j) of the MCG 210. This implementation provides a carrier aggregation solution to the Duplication process. In yet another implementation, the duplicated PDCP PDUs are sent to a bearer (e.g., bearer 212 or 214) in the MCG and another bearer (e.g., bearer 222 or 224) in the SCG 220. After multiplexing in the MAC layers of the corresponding MCG 210 and the SCG 220, the duplicated packets are sent through different component carriers (e.g., CC #i and CC #a) of different cell groups. This implementation provides a dual connectivity solution to the Duplication process.

Figure 3:
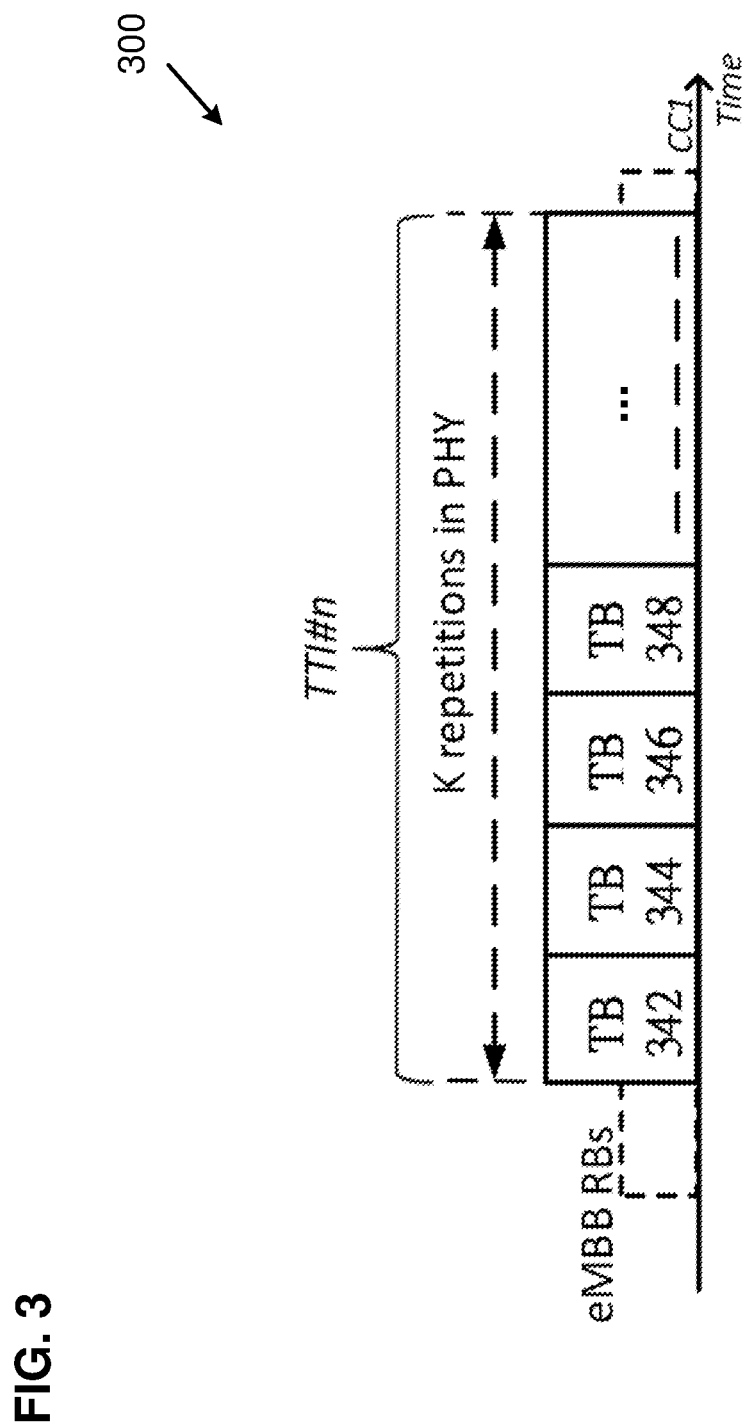
FIG. 3 is a schematic diagram illustrating a Repetition process, according to an exemplary implementation of the present application.

FIG. 3 is a schematic diagram illustrating a TB Repetition process, according to an exemplary implementation of the present application. In a diagram 300 of FIG. 3, when Repetition is activated for a UL or DL URLLC TB transmission scheme with/without UL grant, the maximum times of TB Repetition (K) including the initial transmission (K≥1) for the same transport block are supported in the PHY layer.

In the present implementation, for a UE configured with K repetitions for a TB transmission (e.g., a UL transmission) with/without grant, the UE can continue to repeat transmitting the TBs (e.g., TBs 342, 344, 346, and 348) within a transmission time interval (e.g., TTI #n) until one of the following conditions is met:

(a) if the UL grant is successfully received for a slot/mini-slot for the same TB;
(b) if an ACK message, sent from the serving cell, is successfully received by the UE;
(c) if the number of repetitions for the TB reaches K.

It should be noted that other termination methods for TB Repetition may apply. For example, the TB Repetition may be configured at grant-less radio resource (e.g., semi-persistently scheduled resource) to a UE, and a base station may allocate dedicated resource to the UE after false reception in the base station side during the TB Repetition. In some other embodiments, a UE may require dedicated resource to a base station (e.g., a gNB) for TB delivery. Under this condition, the UE may send a buffer status report (BSR) for how many TBs (with/without counting the TB repetitions) which the UE is preparing to send. After receiving the BSR from the UE, the base station may provide dedicated resource and may also decide the number of repetitions (K) to the UE. The base station may decide the value of K, and allocate the dedicated resource to the UE based on the BSR and the value of K. The base station may decide the value of K based on the signal quality of a UL reference signal delivered by the UE or a measurement report provided by the UE. With dedicated resources, the UE may also stop Repetition by the provided approaches below.

Figure 4:
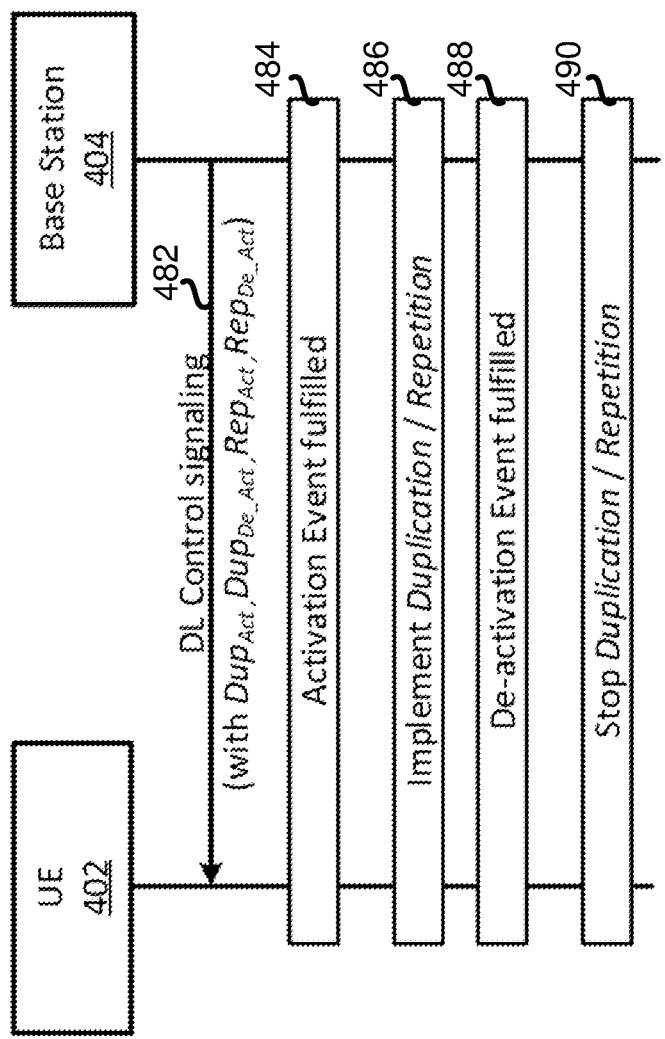
FIG. 4 is a diagram illustrating event-based activation/deactivation of PDCP PDU Duplication and TB Repetition, according to an exemplary implementation of the present application.

FIG. 4 is a diagram illustrating event-based activation/deactivation of PDCP PDU Duplication and TB Repetition, according to an exemplary implementation of the present application. In FIG. 4, a diagram 400 includes a UE 402 and a base station (e.g., a gNB) 404. In action 482 of the diagram 400, the base station 404 provides activation and deactivation events for Duplication and Repetition, and the related Duplication and Repetition configurations, for a concerned radio bearer through control signaling (e.g., DL RRC signaling) to the UE 402. For example, the base station 404 may provide the activation and deactivation events for Duplication and Repetition when the radio bearer (e.g., SRB or DRB) is initiated or the radio bearer is re-configured, or when the RAN re-configures the configurations of multi-connectivity settings (e.g., SCG change, release, and modification or master base station handover).

As shown in FIG. 4, after the base station 404 configures activation and/or deactivation events at the RAN configuration stage in action 482, the UE 402 may monitor the packet delivery conditions for the opportunities to activate Duplication and/or Repetition. In action 484, an activation event for Duplication or Repetition occurs or is fulfilled. In action 486, the UE 402 may implement Duplication and/or Repetition, for example, at the RAN implementation stage. During the RAN implementation stage, the UE 402 may monitor the opportunities to deactivate Duplication and/or Repetition. In action 488, a deactivation event for Duplication or Repetition occurs or is fulfilled. In action 490, the UE 402 may stop implementing Duplication and/or Repetition.

The activation and deactivation events for Duplication and Repetition include the following parts:

(a) Exemplary implementations of Activation Events for Duplication ($Dup_{Act}$) are provided in Table 1-1.

TABLE 1-1

Activation Events for Duplication ($Dup_{Act}$)
Activation Events of PDCP PDU Duplication ($Dup_{Act}$)

| Event | Triggering condition in the original bearer |
|---|---|
| E#A-1 | Amount of pending packet in RLC buffer is higher than a threshold ($T_{act\_A1}$) |
| E#A-2 (For bi-directional mode bearer) | The UE receives the ACK response of any transmitting RLC PDU longer than a Time value ($T_{act\_A2}$) |
| E#A-2A | $N_{A2} \geq S_{Act\_A2}$, where $N_{A2}$ is the number of ARQ NACK message that the Tx receives in continuous reception and $S_{Act\_A2}$ is a activation threshold provided in the Duplication configuration |
| E#A-3 | The PDCP PDU size is not smaller than a threshold ($S_{act\_A3}$) |
| E#A-4 | (1) gNB activates Duplication through dedicated signaling (e.g. RRC signaling or MAC control element signaling). |

TABLE 1-1-continued

Activation Events for Duplication ($Dup_{Act}$)
Activation Events of PDCP PDU Duplication ($Dup_{Act}$)

| Event | Triggering condition in the original bearer |
|---|---|
| | (2) gNB would further indicate which Duplication configuration that the UE should implement at the RAN implementation stage. |

(b) Exemplary implementations of Deactivation Events for Duplication ($Dup_{De\_Act}$) are provided in Table 1-2.

TABLE 1-2

Deactivation Events for Duplication ($Dup_{De\_Act}$)
Deactivation Events of PDCP PDU Duplication ($Dup_{De\_Act}$)

| Event | Triggering condition in the original bearer |
|---|---|
| E#DA-1 | RLC buffering status is lower than a threshold ($T_{De-act\_A1}$) during an observation moving time window ($W_{De-act\_A1}$). |
| E#DA-2 (For bi-directional bearer) | RLC layer in the Tx side receives at least $N_{De-act\_A2}$ continuous ACK responses which the response times are shorter than a time value ($T_{De-act\_A2}$) during a moving time window ($W_{De-act\_A2}$). |
| E#DA-3 | The PDCP PDU size is smaller than a threshold ($S_{act\_A3}$). |
| E#DA-4 | (1) gNB deactivates Duplication through dedicated signaling (e.g. RRC signaling or MAC control element signaling). (2) gNB may also re-indicate another Duplication configuration to the UE in the dedicated signaling. |

For activation and deactivation of Duplication, UE 402 may monitor the radio bearer condition (e.g., packet delivery status in the PDCP layer or RLC layer) of the original bearer, which is the radio bearer that the UE builds to support the target service (or for control signaling).

(c) Exemplary implementations of Activation Events for Repetition ($Rep_{Act}$) are provided in Table 1-3.

TABLE 1-3

Activation Events for Repetition ($Rep_{Act}$)
Activation Events of TB Repetition ($Rep_{Act}$)

| Event | Triggering condition in the target component carrier |
|---|---|
| E#C-1 | Signal strength of data packets/control signaling/reference signaling(s) in target CC is lower than a threshold ($S_{act\_C1}$) |
| E#C-2 | The ratio of HARQ NACK/No response event during the latest continuous $N_{act\_C2}$ TB transmissions, $R_{act\_C2}$, is higher than a threshold, $S_{act\_C2}$. |
| E#C-2A | $N'_{C2} \geq S'_{Act\_C2}$, where $N'_{C2}$ is the number of NACK message and no response event that the Tx receives in continuous reception and $S'_{Act\_C2}$ is a activation threshold provided in the Repetition configuration |
| E#C-3 | The PDCP PDU size is smaller than a threshold ($S_{act\_C3}$) |
| E#C-4 | (1) gNB activates Repetition through dedicated signaling (2) gNB would further indicate which Repetition configuration that the UE should implement at the RAN implementation stage. |

(d) Exemplary implementations of Deactivation Events for Repetition ($Rep_{De\_Act}$) are provided in Table 1-4.

TABLE 1-4

Deactivation Events of Repetition ($Rep_{De\_Act}$)
Deactivation Events of TB Repetition ($Rep_{De\_Act}$)

| Event | Triggering condition in the target component carrier |
|---|---|
| E#DC-1 | Signal strength of data packets/control signaling/reference signaling(s) in target CC is higher than a threshold $S_{De-act\_C1}$, during an time window, $T_{De-act\_C1}$. |
| E#DC-2 | The ratio of HARQ NACK/No response events during the latest continuous $N_{De-act\_C2}$ TB transmissions ($R_{De-act\_C2}$) is smaller than a threshold, $S_{De-act\_C2}$. |
| E#DC-3 | The PDCP PDU size is not smaller than a threshold ($S_{De-act\_C3}$) |
| E#DC-4 | (1) gNB deactivates Repetition through dedicated signaling. (2) gNB may also re-indicate another Duplication configuration to the UE in the dedicated signaling. |

For activation and deactivation of Repetition, UE 402 may monitor the channel condition of the component carrier(s) where the packets of target service (or control signaling) are delivered.

In some implementations, the activation and deactivation events of Duplication and/or Repetition are treated separately. For example, UE 402 may activate and deactivate Duplication based on $Dup_{Act}$ and $Dup_{De\_Act}$, respectively, and may activate and deactivate Repetition based on $Rep_{Act}$ and $Rep_{De\_Act}$, respectively. However, in some other implementations, a mixed configuration approach may also be provided. Details of the mixed configuration approach will be provided below.

Figure 5:
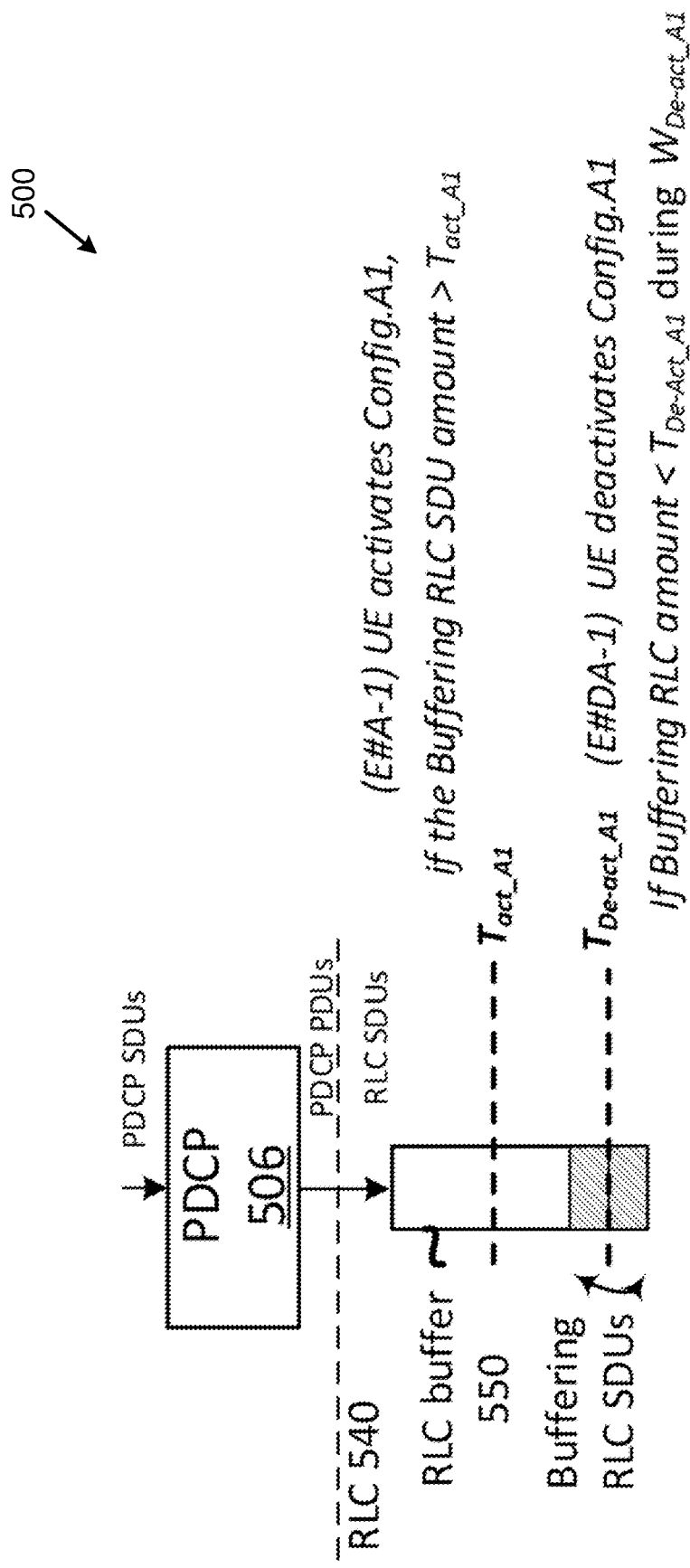
FIG. 5 is a diagram illustrating an exemplary activation event and an exemplary deactivation event, according to an exemplary implementation of the present application.

FIG. 5 is a diagram illustrating an exemplary activation event and an exemplary deactivation event, according to an exemplary implementation of the present application. In a diagram 500 of FIG. 5, the activation event (E #A-1) and the deactivation event (E #DA-1) in the diagram 500 are based on the buffering condition in a RLC buffer 550 of the original bearer (e.g., SRB or DRB). As shown in FIG. 5, PCDP service data units (SDUs) are packaged in a PDCP layer 506. The PDCP layer 506 provides PDCP PDUs to a RLC buffer 550 in a RLC layer 540. The PDCP PDUs are named RLC SDUs after they are sent to the RLC layer 540. In activation event E #A-1, a threshold, $T_{act\_A1}$, for the pending RLC SDUs in the RLC buffer 550 is provided. The activation event E #A-1 is fulfilled when the amount of pending RLC SDUs in the RLC buffer 550 is higher than the threshold, $T_{act\_A1}$ (e.g., 200 Kbytes). When activation event E #A-1 is fulfilled, a UE may activate Duplication. Exemplary implementations of Duplication are disclosed in the next section. After Duplication is activated, the UE may continue to monitor the RLC buffer's buffering condition/status of the original bearer SRB or DRB) for possible deactivation opportunities of Duplication. In deactivation event E #DA-1, another threshold, $T_{De-act\_A1}$, for the pending RLC SDUs in the RLC buffer 550 is provided. In one implementation, the threshold, $T_{De-act\_A1}$, may be 50 Kbytes. In other implementations, the threshold, $T_{De-act\_A1}$, may be other values such as greater than or less than 50 Kbytes. The deactivation event E #DA-1 is fulfilled when the amount of pending RLC SDUs in the RLC buffer 550 of the original bearer is lower than the threshold ($T_{De-act\_A1}$), for example, during a configured observation moving time window, $WDe_{-act\_A1}$, (e.g., 1s).

Figure 6:
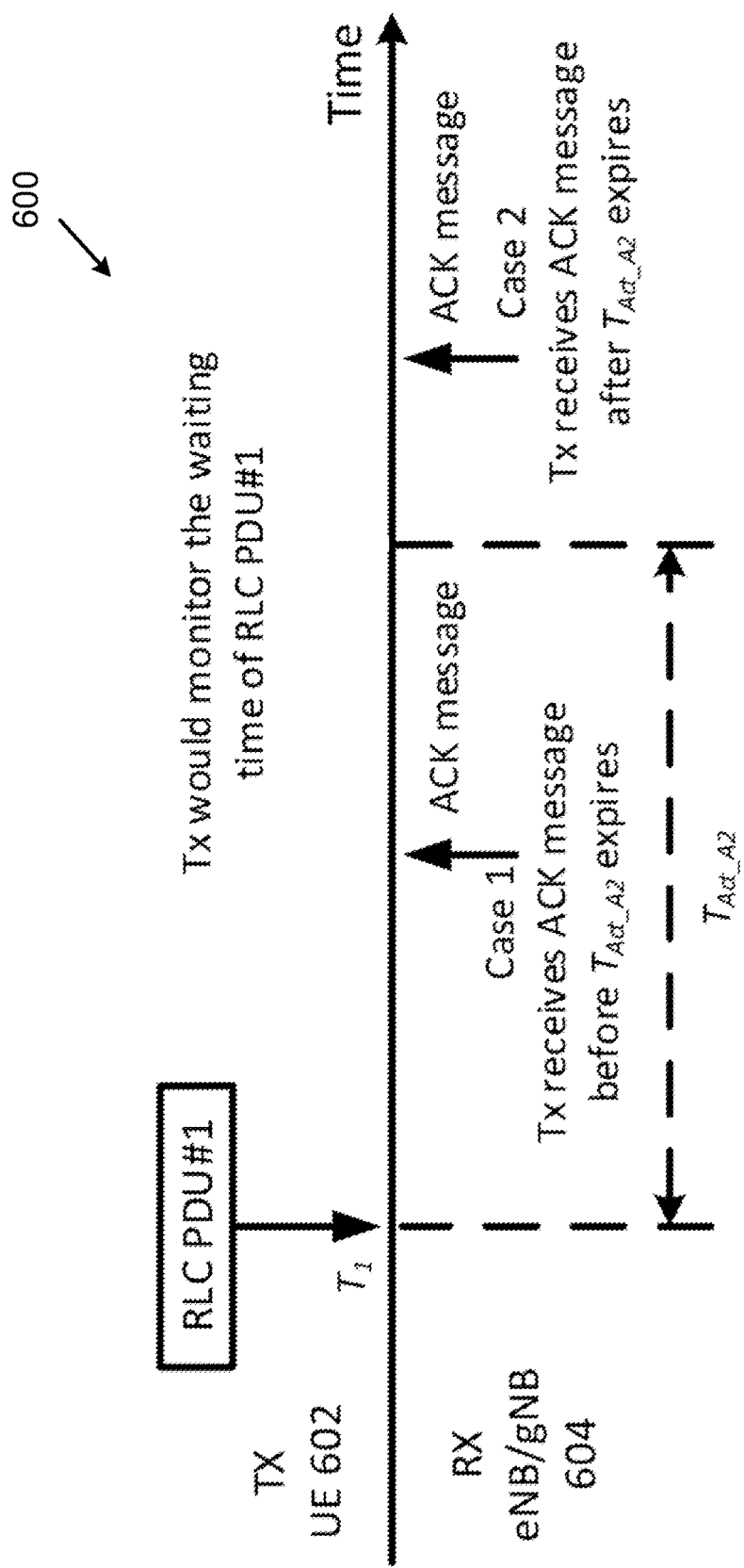
FIG. 6 is a diagram illustrating an exemplary activation event, according to an exemplary implementation of the present application.

FIG. 6 is a diagram illustrating an exemplary activation event, according to an exemplary implementation of the present application. As shown in a diagram 600, in an RLC layer, every RLC SDU may be segmented into (at least one) RLC PDU. An RLC Acknowledge Mode (AM) may be applied to the original bearer, so that a transmitter UE (Tx) may receive an ACK or a NACK message from a base station (e.g., gNB) (Rx) after transmitting each RLC PDU.

Under activation event E #A-2, the transmitter UE 602 may trigger a pre-configured timer, having a time value of $T_{act\_A2}$, after an RLC PDU is delivered to the MAC layer for scheduling and transmission. In one implementation, the pre-configured timer having $T_{act\_A2}$ is configured by the transmitter UE 602. In one implementation, the time value of $T_{act\_A2}$ may be 5 ms. In other implementations, the time value of $T_{act\_A2}$ may be other values such as greater than or less than 5 ms.

As shown in FIG. 6, when the RLC PDU #1 is delivered to the MAC layer at $T_1$, the transmitter UE 602 may set a timer which has the value=$T_{act\_A2}$, and then count it down. In Case 1 of FIG. 6, the transmitter UE 602 receives an ACK message before the timer is down to zero. Thus, the transmitter UE 602 does not activate Duplication in Case 1, and the timer would be reset in the next RLC PDU transmission. In Case 2 of FIG. 6, the transmitter UE 602 receives an ACK message after the $T_{act\_A2}$ (e.g., after the timer expired). Thus, the transmitter UE 602 may activate Duplication.

In some implementations, the activation event may also be decided by a reception of a NACK message or no-response from the receiver base station (e.g., activation event E #A-2A in Table 1-3). For example, the transmitter UE 602 may record the number of ARQ NACK messages that the receiver base station 604 receives during continuous receptions, $N_{A2}$. Based on activation event E #A-2A, the transmitter UE 602 may activate Duplication when $N_{A2} \geq S_{Act\_A2}$, where $S_{Act\_A2}$ is also an activation threshold provided in the Duplication configuration.

Figure 7:
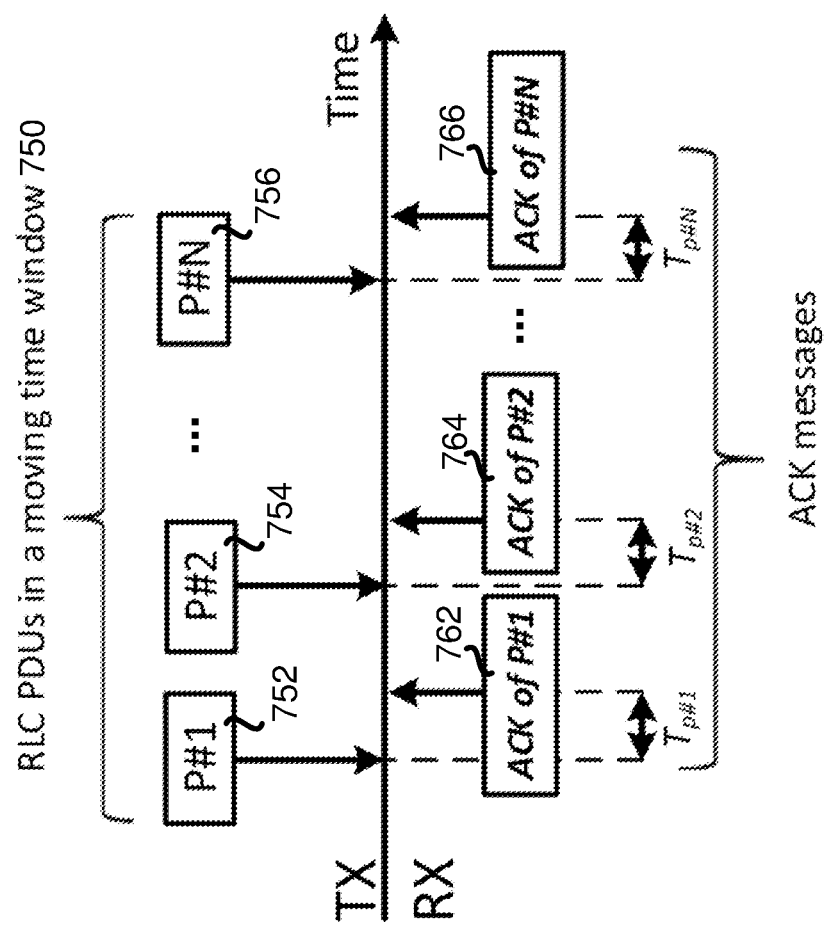
FIG. 7 is a diagram illustrating an exemplary deactivation event, according to an exemplary implementation of the present application.

FIG. 7 is a diagram illustrating an exemplary deactivation event, according to an exemplary implementation of the present application. In the present implementation, the exemplary deactivation event may correspond to deactivation event E #DA-2 in Table 1-2 above. In a diagram 700 of FIG. 7, a transmitter (e.g., UE 402), may record a response time (e.g., $T_{p\ \#1}$, $T_{p\ \#2}$, $T_{p\ \#3}$, etc.) for each RLC PDUs (e.g., 752, 754, 756, etc.) within a moving time window 750 during the packet transmission on the original bearer. Deactivation event E #DA-2 may be fulfilled when the RLC layer in the transmitter receives at least $N_{De-act\_A2}$ consecutive number (e.g., 3 times) of ACK responses from the receiver (e.g., base station 404), where the response time for each of the ACK responses (e.g., 762, 764, 766, etc.) is shorter than a threshold time value, $T_{De-act\_A2}$, (e.g., 1 ms). For example, if the latest consecutive number ($N_{De-act\_A2}$) of RLC PDUs, for which the transmitter receives ACK messages from the receiver, have response times all less than $T_{De-act\_A2}$, then Duplication may be stopped. In one implementation, the values of $N_{De-act\_A2}$, and $T_{De-act\_A2}$ may be configured by the RAN.

Figure 8:
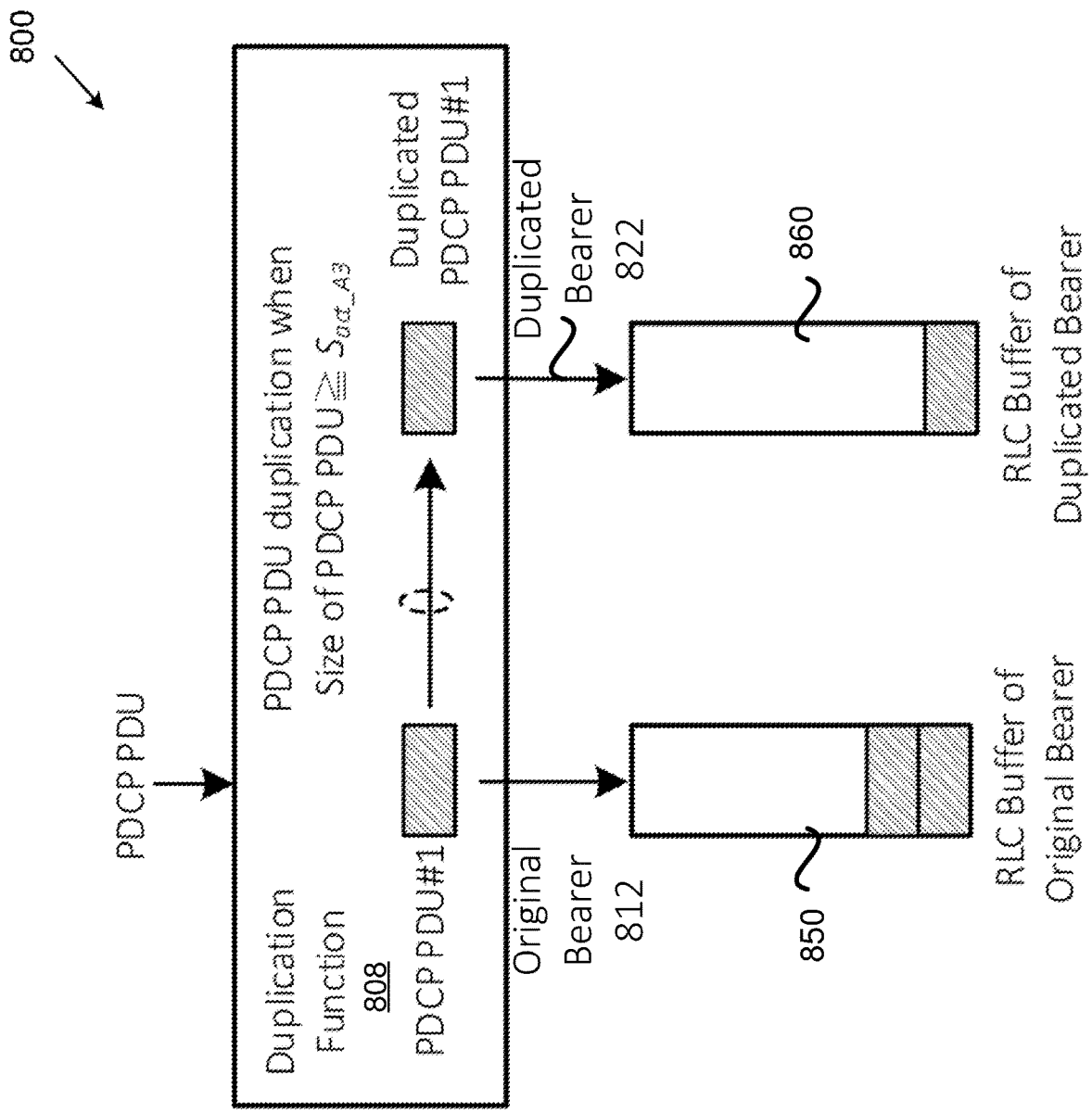
FIG. 8 is a diagram illustrating an exemplary activation event, according to an exemplary implementation of the present application.

FIG. 8 is a diagram illustrating an exemplary activation event, according to an exemplary implementation of the present application. In the present implementation, the exemplary activation event may correspond to activation event E #A3 in Table 1-1 above. In a diagram 800 of FIG. 8, a UE is provided with a threshold of PDCP PDU size, $S_{act\_A3}$. In one implementation, the threshold of PDCP PDU size, $S_{act\_A3}$, may be 500 Kbytes. In other implementations, the threshold of PDCP PDU size, $S_{act\_A3}$, may be other values such as greater than or less than 500 Kbytes. In the present implementation, the UE may activate Duplication, with a duplicated bearer 822 as shown in FIG. 8, when a duplication function 808 determines that the size of the PDCP PDU is greater than or equal to $S_{act\_A3}$ (e.g., the size of PDCP PDU$\geq S_{act\_A3}$). The dedicated bearer 822 may be configured by the base station (e.g., a gNB/eNB) through DL control signaling, or selected by the UE. As such, the duplication function 808 may duplicate the PDCP PDU, and deliver the duplicated PDCP PDU to the RLC buffer 860 of the duplicated bearer 822, which is different from the RLC buffer 850 of the original bearer 812. Conversely, the UE does not activate Duplication when the duplication function 808 determines that the size of the pending PDCP PDU is smaller than $S_{act\_A3}$ (e.g., Size of PDCP PDU<$S_{act\_A3}$). In such case, only the PDCP PDU is delivered to the RLC buffer 850 of the original bearer 812.

Figure 9:
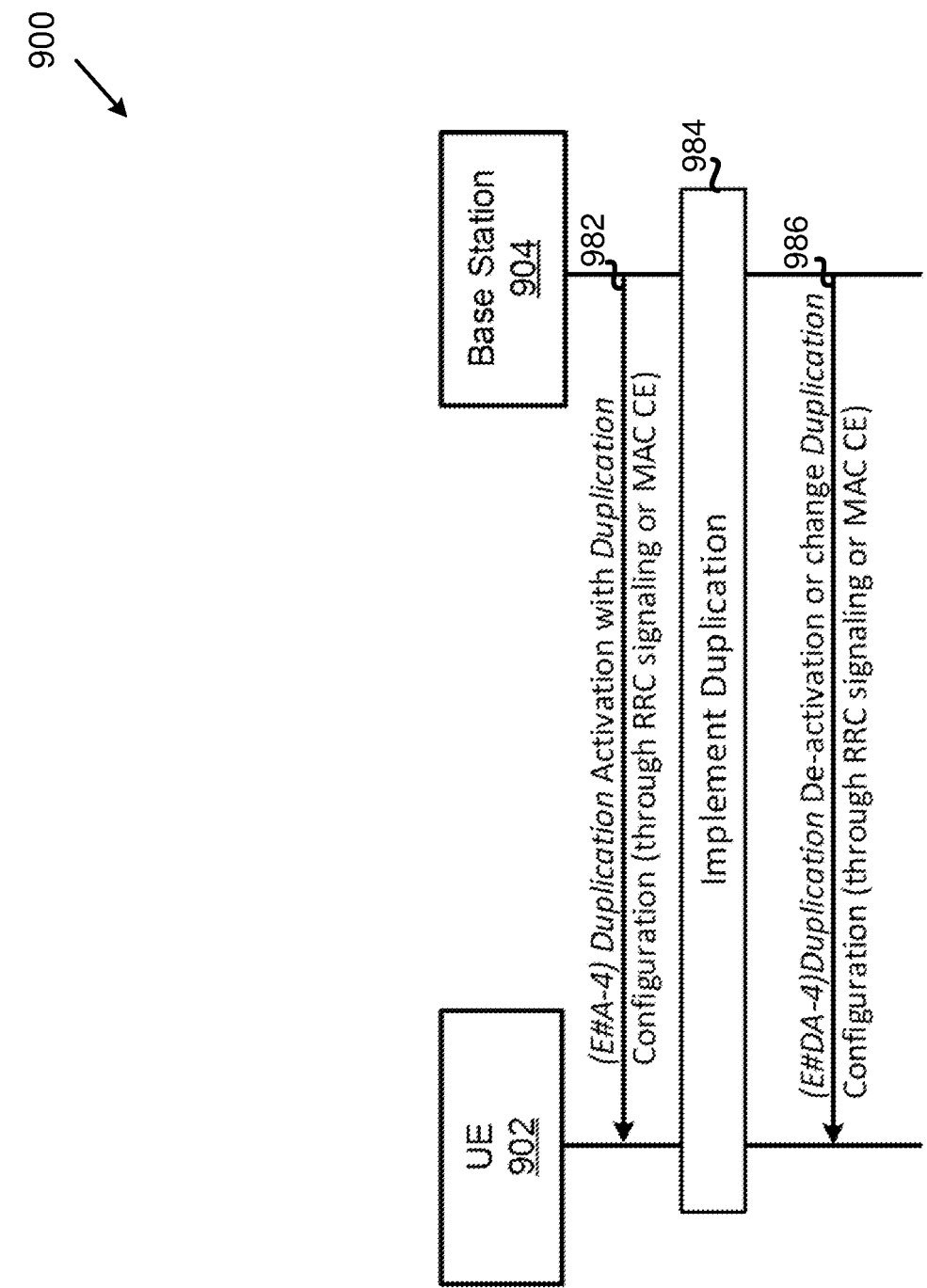
FIG. 9 is a diagram illustrating activation/deactivation of Duplication through dedicated signaling, according to an exemplary implementation of the present application.

FIG. 9 is a diagram illustrating activation/deactivation of Duplication through dedicated signaling, according to an exemplary implementation of the present application. In FIG. 9, a diagram 900 includes a UE 902 and a base station (e.g., a gNB) 904. In FIG. 9, in action 982, base station 904 may activate Duplication through dedicated signaling, which may be through RRC signaling or MAC CE signaling. Moreover, base station 904 may also provide the Duplication configuration in the dedicated signaling. Once Duplication is activated, Duplication may be implemented in action 984. Also shown in FIG. 9, in action 986, base station 904 may deactivate Duplication through dedicated signaling. In addition, base station 904 may also re-configure the Duplication configuration through the dedicated signaling. In the present implementation, the exemplary activation event may correspond to activation event E #A4 in Table 1-1 above, and the exemplary deactivation event may correspond to deactivation event E #DA4 in Table 1-2 above.

Table 1-3 above shows that activation events for Repetition (Rep$_{Act}$). It is should be noted that, before activating Repetition, the MAC scheduler may need to acquire knowledge of whether a packet is applicable to Repetition when the MAC scheduler is preparing to send the TBs over the air link. In some implementations, the MAC scheduler is indicated by a logical channel mapping method: one specific logical channel may be reserved for URLLC service or for service with special QoS requirements. So, all the packets from this specific logical channel can be applicable for Repetition. In some other embodiments, the MAC scheduler learns that packets of one logical channel is applicable to Repetition by receiving DL control signaling (e.g., RRC signaling) from serving cells.

Figure 10:
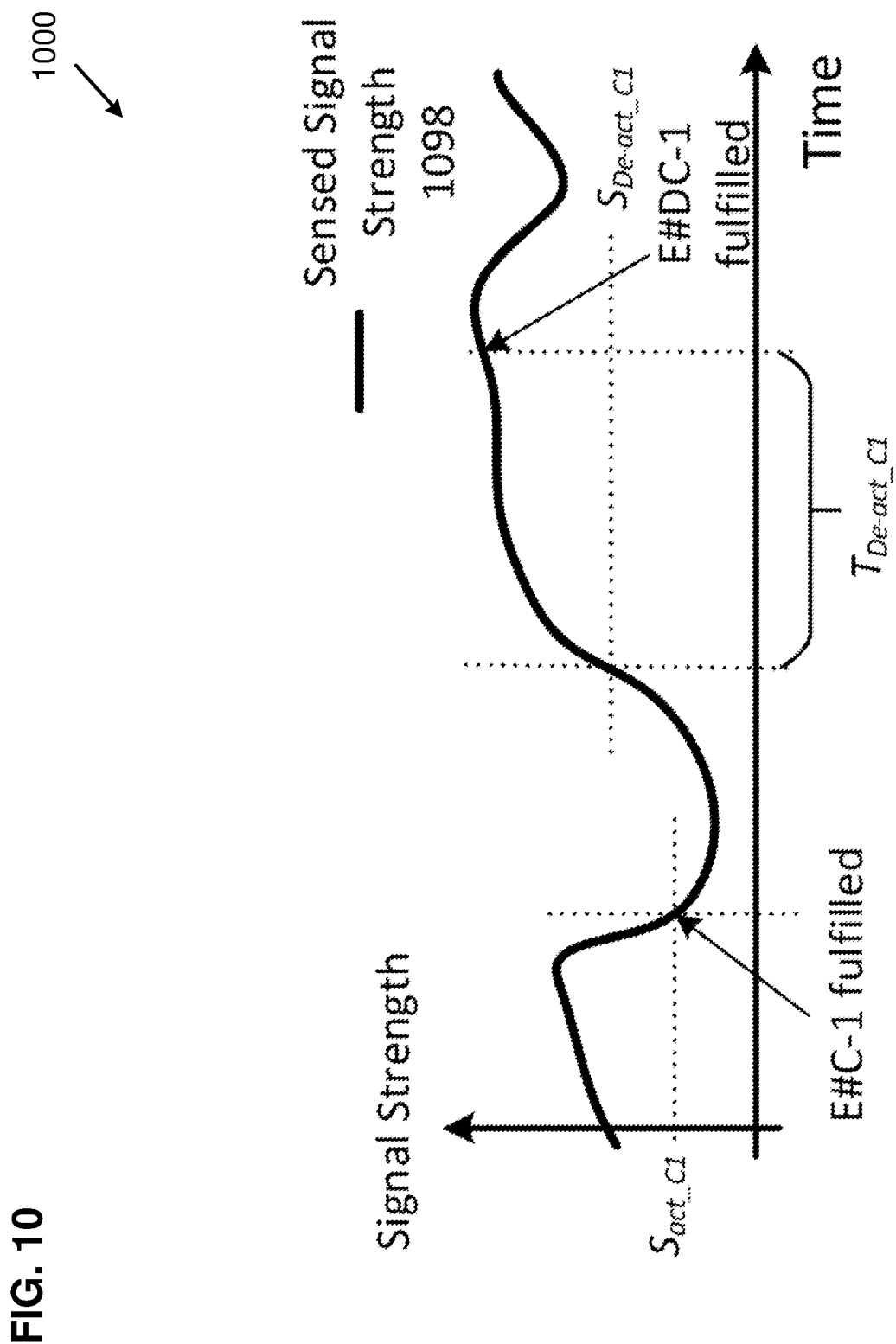
FIG. 10 is a diagram illustrating an exemplary activation event and an exemplary deactivation event for Repetition, according to an exemplary implementation of the present application.

FIG. 10 is a diagram illustrating an exemplary activation event and an exemplary deactivation event for Repetition, according to an exemplary implementation of the present application. In the present implementation, the exemplary activation event may correspond to activation event E #C-1 in Table 1-3 above, and the exemplary deactivation event may correspond to deactivation event E #DC-1 in Table 1-4 above. In FIG. 10, a diagram 1000 shows activation event E #C-1, where the MAC scheduler in the transmitter may activate Repetition when transmitter (e.g., UE 402) senses the signal strength 1098 of a target component carrier (CC) is lower than a threshold, $S_{act\_C1}$ (e.g., −10 dB (RSRQ) or −90 dBm (RSRP)). The target component carrier is the component carrier in frequency domain which the TB is going to be delivered. The transmitter may derive the signal strength 1098 by monitoring the reference signal(s) (e.g., synchronization signals, Channel State Information-Reference Si (CSI-RS)), which have been delivered by the receiver side Base Station 404). The diagram 1000 also shows deactivation event E #DC-1, where the transmitter may deactivate Repetition after the transmitter senses the signal strength 1098 of the target CC is higher than a threshold, $S_{De\text{-}act\_C1}$ (e.g., −5 dB (RSRQ) or −75 dBm (RSRP)) over a time window, $T_{De\text{-}act\_C1}$, (e.g., 100 ms), for example.

Figure 11:
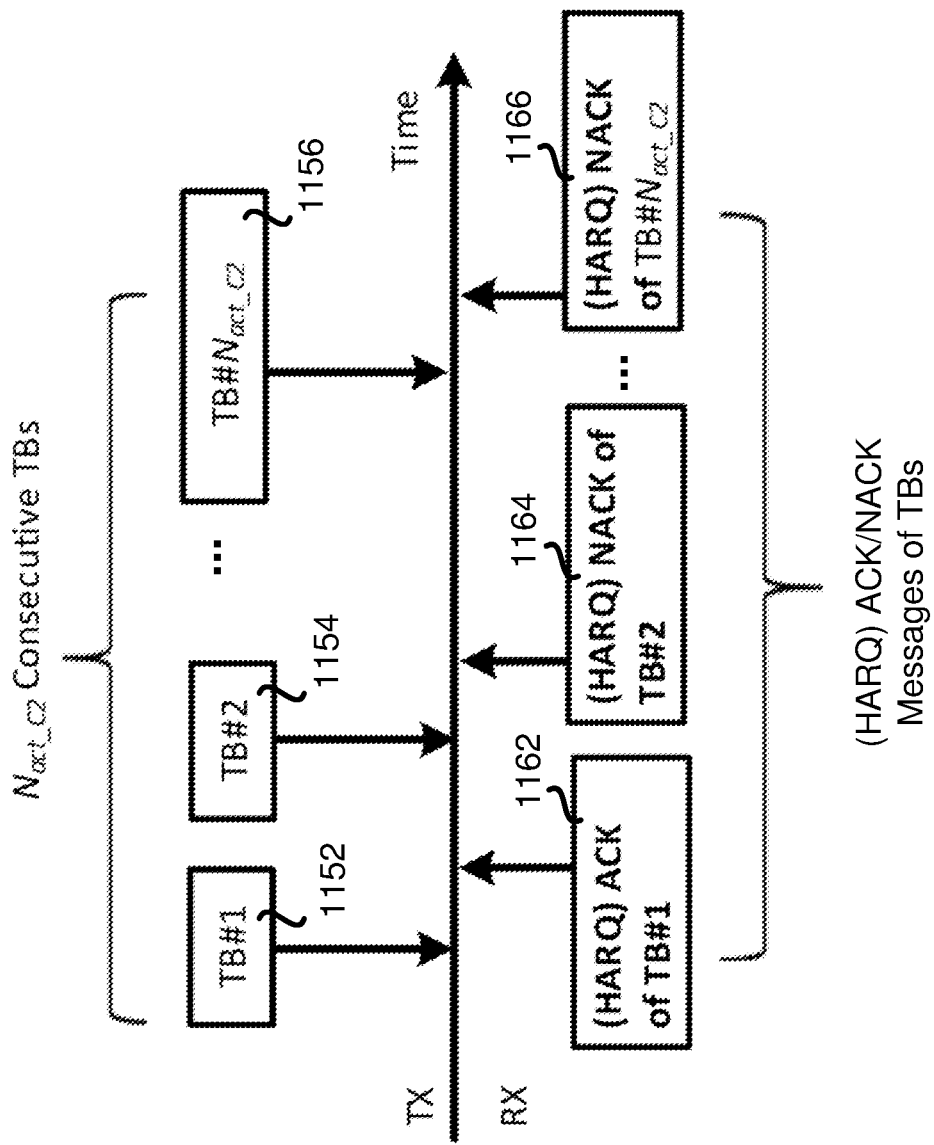
FIG. 11 is a diagram illustrating an exemplary activation event and an exemplary deactivation event for Repetition, according to an exemplary implementation of the present application.

FIG. 11 is a diagram illustrating an exemplary activation event and an exemplary deactivation event for Repetition, according to an exemplary implementation of the present application. In the present implementation, the exemplary activation event may correspond to activation event E #C-2 in Table 1-3 above, and the exemplary deactivation event may correspond to deactivation event E #DC-2 in Table 1-4 above.

As shown in a diagram 1100, a MAC scheduler in a transmitter (e.g., UE 402) may record a HARQ ACK message (e.g., 1162), a HARQ NACK message (e.g., 1164/1166) from the receiver (e.g., base station 404), or a no-response event for each TB transmission (e.g., TBs 1152, 1154, 1156, etc.). Also, a HARQ ACK message, a HARQ NACK message, or a no-response event for each repeated TB is recorded separately in the record when Repetition is activated. In the present implementation, the MAC scheduler in a transmitter is configured to monitor the latest number, $N_{act\_C2}$, of consecutive TB transmissions, and calculate a ratio, $R_{act\_C2}$, of the total number of NACK messages and no-response events to the latest number ($N_{act\_C2}$) of the consecutive TB transmissions. Activation event E #C-2 is fulfilled when the ratio, $R_{act\_C2}$, is greater than a threshold, $S_{act\_C2}$, (e.g., $R_{act\_C2} > S_{act\_C2}$). In one implementation, the threshold, $S_{act\_C2}$, may be 0.3. In another implementation, the threshold, $S_{act\_C2}$, may be other values, such as greater than or less than 0.3. The MAC scheduler may activate Repetition when activation event E #C-2 is fulfilled. The MAC scheduler may continue to monitor the ACK/NACK/No-response events after Repetition is activated. The ratio, $R_{act\_C2}$, is updated after every TB transmission once Repetition is activated In another implementation (such as E #C-2A), the transmitter may record the number ($N'_{act\_C2}$) of consecutive NACK messages and no-response events during TB transmissions. Then, the transmitter may activate Repetition when $N'_{act\_C2} \geq S'_{act\_C2}$, where the $S'_{act\_C2}$ is an activation threshold provided through DL control signaling.

After Repetition is activated, the MAC scheduler in the transmitter is configured to monitor the latest number, $N_{De\text{-}act\_C2}$, of consecutive TB transmissions, and calculate a ratio, $R_{De\text{-}act\_C2}$, of the total number of NACK messages and no-response events to the latest number ($N_{De\text{-}act\_C2}$) of the consecutive TB transmissions. Deactivation event E #DC-2 is fulfilled when the ratio, $R_{De\text{-}act\_C2}$, is less than a threshold, $S_{De\text{-}act\_C2}$, (e.g., $R_{De\text{-}act\_C2} < S_{De\text{-}act\_C2}$). In one implementation, the threshold, $S_{De\text{-}act\_C2}$, may be 0.1. In another implementation, the threshold, $S_{act\_C2}$, may be other values, such as greater than or less than 0.1. The MAC scheduler may deactivate Repetition when deactivation event E #DC-2 is fulfilled. The ratio, $R_{De\text{-}act\_C2}$, is updated after every TB transmission after Repetition is activated.

Figure 12:
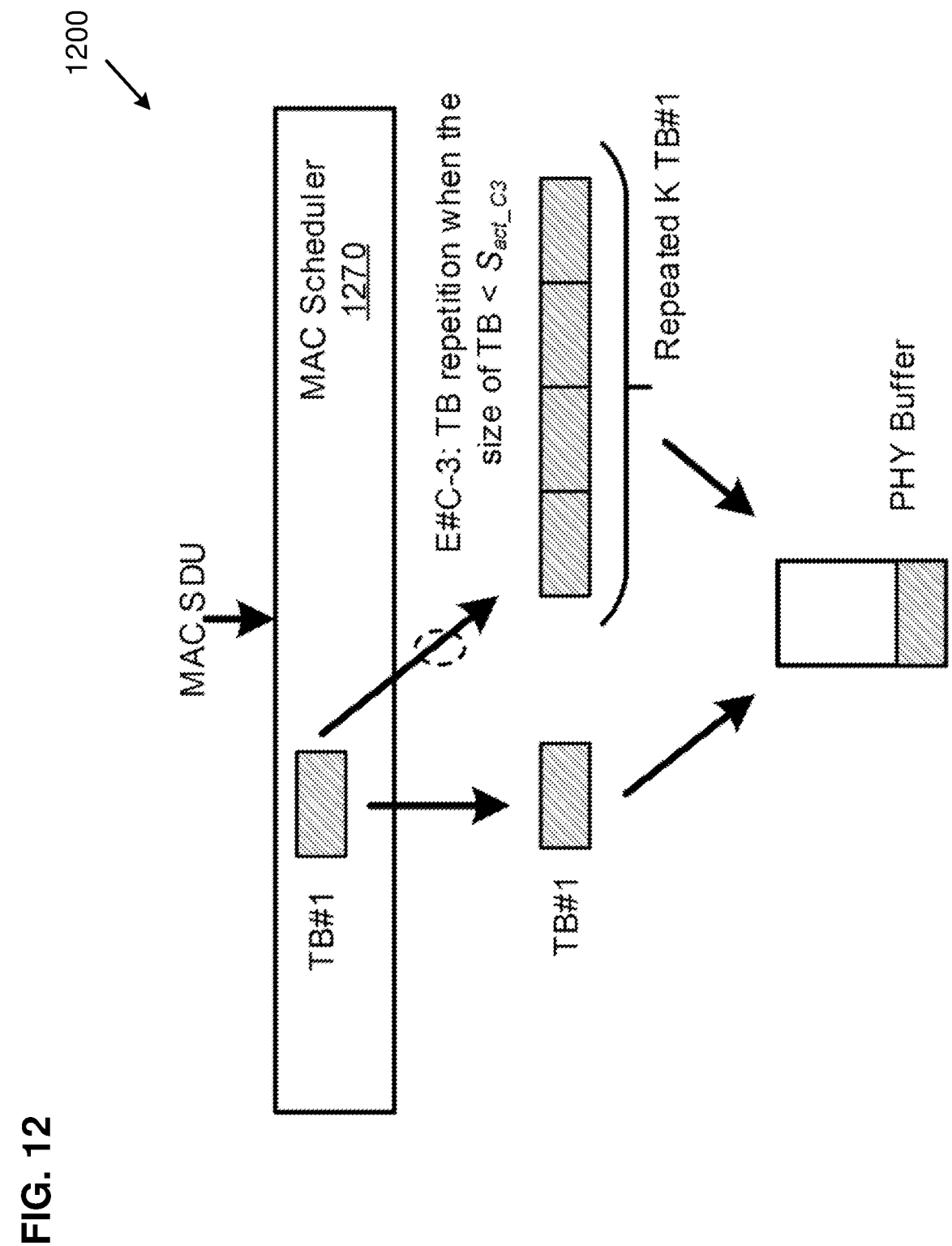
FIG. 12 is a diagram illustrating an exemplary activation event and an exemplary deactivation event for Repetition, according to an exemplary implementation of the present application.

FIG. 12 is a diagram illustrating an exemplary activation event and an exemplary deactivation event for TB Repetition, according to an exemplary implementation of the present application. In the present implementation, the exemplary activation event may correspond to activation event E #C-3 in Table 1-3 above, and the exemplary deactivation event may correspond to deactivation event E #DC-3 in Table 1-4 above. The activation event E #C-3 is fulfilled when the TB size is smaller than a threshold, $S_{act\_C3}$ (e.g., 200 Kbytes). In one implementation, the TB size threshold, $S_{act\_C3}$, may be 200 Kbytes. In other implementations, the TB size threshold, $S_{act\_C3}$, may be other values such as greater than or less than 200 Kbytes. A MAC scheduler 1270 may activate Repetition when activation event E #C-3 is fulfilled. Conversely, the deactivation event E #DC-3 is fulfilled when the TB size is greater than or equal to the threshold, $S_{act\_C3}$. The MAC scheduler 1270 may deactivate Repetition when the deactivation event E #DC-3 is fulfilled. In one exemplary implementation, the base station may configure different maximum number (K) of times for repeating the TB based on the TB size. For example, $K=K_1$ for TB size $<S_{act\_C3}$ and $K=K_2$ for TB size $\geq S_{act\_C3}$.

Figure 13:
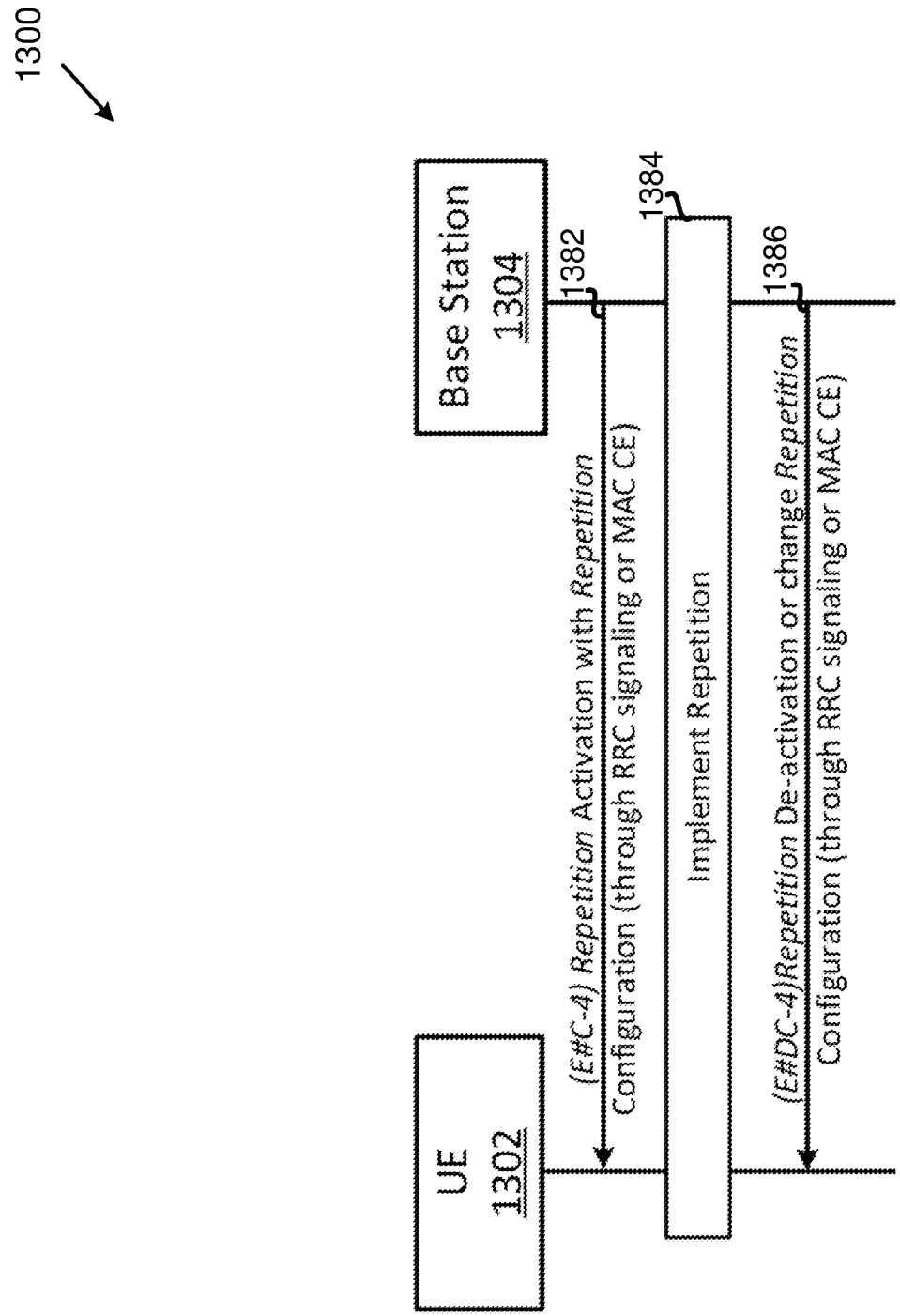
FIG. 13 is a diagram illustrating activation and deactivation of Repetition through dedicated signaling, according to an exemplary implementation of the present application.

FIG. 13 is a diagram illustrating activation/deactivation of Repetition through dedicated signaling, according to an exemplary implementation of the present application. In FIG. 13, a diagram 1300 includes a UE 1302 and a base station (e.g., a gNB) 1304. In action 1382, the base station 1304 may activate Repetition through dedicated signaling, which may be through radio resource control (RRC) signaling or MAC CE signaling. Moreover, the base station 1304 may also provide the Repetition configuration in the dedicated signaling. Once Repetition is activated, Repetition may be implemented in action 1384. In action 1386, the base station 1304 may deactivate Repetition through dedicated signaling. In addition, the base station 1304 may also re-configure Repetition configuration through the dedicated signaling. In the present implementation, the exemplary activation event may correspond to activation event E #C-4 in Table 1-3 above, and the exemplary deactivation event may correspond to deactivation event E #DC-4 in Table 1-4 above.

As described above, with reference to FIG. 4, after the base station configures activation and/or deactivation events at the RAN configuration stage, the UE may monitor the packet delivery conditions and/or DL reference signalings for the opportunities to activate Duplication and/or Repetition. Then, the UE may implement Duplication and/or Repetition at the RAN implementation stage. During the RAN implementation stage, the UE may monitor the opportunities to deactivate Duplication and/or Repetition.

The following exemplary implementations show how a base station (e.g., a gNB) may provide control signaling (e.g., DL control signaling) and the UE's behavior after receiving the control signaling.

In Implementation 1-1, a base station may provide multiple activation/deactivation events in the DL control signaling. As shown in Table 2-1, the base station configures {E #A-1, E #A-2} for $Dup_{Act}$; the base station also configures {E #DA-1, E #DA-2} for $Dup_{De\_Act}$. The base station configures {E #C-1, E #C-2} for $Rep_{Act}$, and configures {E #DC-1, E #DC-2} for $Rep_{De\_Act}$.

Figure 14:
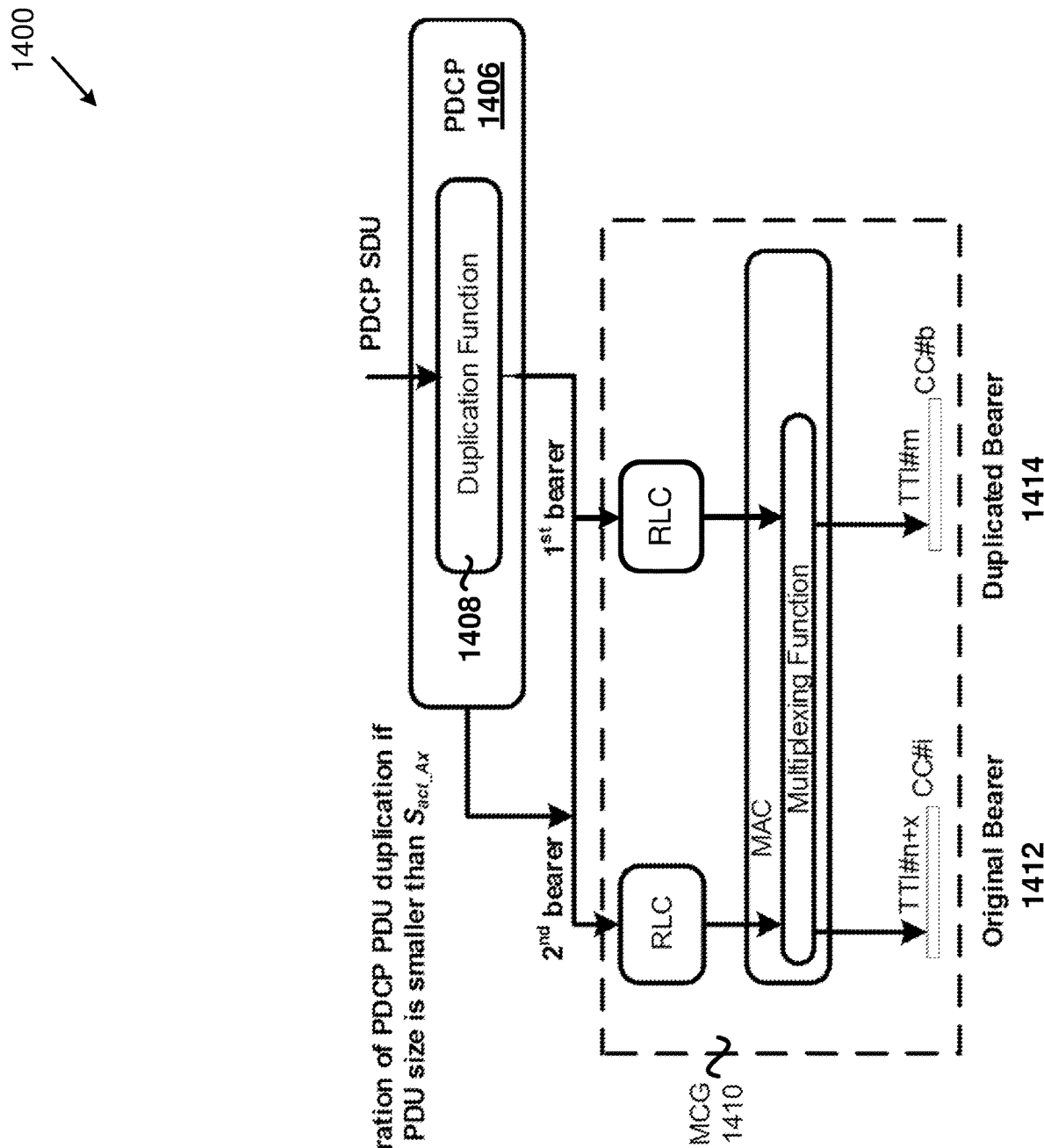
FIG. 14 is a schematic diagram illustrating an exemplary Duplication configuration, according to an exemplary implementation of the present application.

In Implementation 1-1, a UE may activate Config.x1 if any of the activation events for Duplication is fulfilled. For example, the UE may activate Duplication if E #A-1 or E #A-2 is fulfilled. The UE may also activate Config.r1 if any of the activation events for Repetition is fulfilled. After Config.x1 or Config.r1 is activated, the UE may deactivate Config.x1/Config.r1, if all of the deactivation events for Duplication/Repetition are fulfilled respectively. For example, the UE may deactivate config.x1 if both E #DA-1 and E #DA-2 are fulfilled. Here, the packet routing routes of Config.x1 is shown in FIG. 14. For Repetition, UE may repeat each TB K times ($K_{r1}=3$) in each TB transmission after Repetition is activated.

TABLE 2-1

| | Implementation 1-1 | |
|---|---|---|
| | Implementation 1-1 | |
| $Dup_{Act}$ | E#A-1 | E#A-2 |
| $Dup_{De\_Act}$ | E#DA-1 | E#DA-2 |
| Duplication configuration | | Activate Config.x1 |
| $Rep_{Act}$ | E#C-1 | E#C-2 |
| $Rep_{De\_Act}$ | E#DC-1 | E#DC-2 |
| Repetition configuration | Activate Config.r1 (repeating each TB $K_{r1}$ times, $K_{r1}$ = 3) | |

In Implementation 1-2, the base station may provide paired activation and deactivation events in one control signaling. In this implementation, an activation event and a deactivation event for Duplication may be paired explicitly (e.g., in the control signaling) or implicitly in the technical specifications). For example, the activation-deactivation pairs for Duplication may include {E #A-1, E #DA-1}, {E #A-2, E #DA-2}, {E #A-3, E #DA-3} and {E #A-4, E #DA-4}. As shown in Table 2-2, E #A-1 and E #DA-1 are provided explicitly in the control signaling (e.g., DL control signaling). A UE may activate Duplication by following Config.x1 when E #A-1 is fulfilled. After Duplication is activated, the UE may deactivate Duplication if E #DA-1 is fulfilled.

In another approach, the base station may not explicitly provide the deactivation event ($Dup_{De\_Act}$) in the control signaling because the UE knows the activation event E #DA-1 is paired with the deactivation event of E #A-1 (e.g., through technical specifications). In this implementation, the paired activation-deactivation events may be also applied to Repetition. It is noted that, for Repetition, the UE may activate Config.r2 if the activation event E #C-1 or E #C-3 is fulfilled. After Repetition is activated, the UE may deactivate Config.r2 only if the deactivation events E #DC-1 and E #DC-3 are fulfilled.

TABLE 2-2

| | Implementation 1-2 | |
|---|---|---|
| | Implementation 1-2 | |
| $Dup_{Act}$ | | E#A-1 |
| $Dup_{De\_Act}$ (may be removed if deactivation event is paired with activation event implicitly) | | E#DA-1 |
| Duplication configuration | | Activate Config.x1 |
| $Rep_{Act}$ | E#C-1 | E#C-3 |
| $Rep_{De\_Act}$ (may be removed if deactivation event is paired with activation event implicitly) | E#DC-1 | E#DC-3 |
| Repetition configuration | Activate Config.r2 (repeating each TB $K_{r2}$ times, $K_{r2}$ = 5, early termination of Repetition based on ACK message from Rx is enabled) | |

In Implementation 1-3, a mixed activation and deactivation for Duplication and Repetition is shown in Table 2-3. In this implementation, the base station only provides activation event E #A-1 and deactivation event E #DA-1 for the activation and deactivation of Duplication and Repetition. Therefore, a UE may activate Duplication and Repetition if the activation event E #A-1 is fulfilled. In addition, the UE may deactivate Duplication and Repetition if the deactivation event E #DA-1 is fulfilled.

TABLE 2-3

| Implementation 1-3 | |
|---|---|
| Implementation 1-3 | |
| $Dup_{Act}$ | E#A-1 |
| $Dup_{De\_Act}$ (may be removed if deactivation event is paired with activation event implicitly) | E#DA-1 |
| Duplication configuration | Activate Config.x1 |
| Repetition configuration | Activate Config.r1 |

In Implementation 1-4, the activation and deactivation of Duplication are based on a PDCP PDU size threshold (e.g., paired activation event E #A-x1 and deactivation event E #DA-x1). As shown in Table 3-1, E #A-x1 and E #A-x2 are two paired activation events for Duplication. E #A-x1 is the activation event where the PDCP PDU size of the pending PDCP PDU is smaller than (or equal to) the PDCP PDU size threshold, $S_{act\_Ax}$. Conversely, E #A-x2 is the activation event where the PDCP PDU size is larger than (or equal to) the PDCP PDU size threshold, $S_{act\_Ax}$. Thus, in this implementation, E #A-x1 and E #A-x2 are regarded as paired activation-deactivation events of each other. As shown in Table 3-2, two configurations (i.e., Config.x1 and Config.x2) and one PDCP PDU size threshold (i.e., $S_{act\_Ax}$) are provided to the UE (e.g., by dedicated signaling).

TABLE 3-1

Activation Events E#A-1 & E#A-2 of Paired Activation/Deactivation Events
Activation Events of PDCP PDU Duplication ($Dup_{Act}$)

| Event | Triggering condition in the original bearer | UE Behavior |
|---|---|---|
| E#A-x1 | PDCP PDU size of the pending PDCP PDU is smaller than (or equal to) $S_{act\_Ax}$ | Activate Config.x1 |
| E#A-x2 | PDCP PDU size of the pending PDCP PDU is larger than $S_{act\_Ax}$ | Activate Config.x2 |

TABLE 3-2

Configurations for PDCP PDU Duplications and Decision Rules

| Configuration | Duplicated bearer | Decision rules |
|---|---|---|
| Config.x1 (CA solution) | Original bearer: $2^{nd}$ bearer in MCG. Duplicated bearer: 1st bearer in MCG. | Duplication function delivers duplicated PDCP PDUs based on Config.x1 if the PDCP PDU size is smaller than (or equal to) $S_{act\_Ax}$ |
| Config.x2 (MC solution) | Original bearer: $2^{nd}$ bearer in MCG. $1^{st}$ Duplicated bear: (Duplicated bearer index) $1^{st}$ bearer in MCG. $2^{nd}$ Duplicated bear: $1^{st}$ bearer in SCG#1. $3^{rd}$ Duplicated bear: $2^{nd}$ bearer in SCG#1. $4^{th}$ Duplicated bear: $1^{st}$ bearer in SCG#2. $5^{th}$ Duplicated bear: $2^{nd}$ bearer in SCG#2. | Duplication function delivers duplicated PDCP PDUs based on Config.x2 if the PDCP PDU size is larger than $S_{act\_Ax}$ |

In FIG. 14, under Config.x1, when the PDCP PDU size of the pending PDCP PDU is smaller than (or equal to) the PDCP PDU size threshold, $S_{act\_Ax}$, a duplication function 1408 in a PDCP layer 1406 may duplicate the PDCP PDU and provide the duplicated PDCP PDU(s) to a first bearer 1414, while the original PDCP PDU is sent to a second bearer 1412 in the MCG 1410. After multiplexing in the MAC layer of the MCG 1410, the original and duplicated packets are sent through different component carriers of the MCG 1410. This implementation provides a carrier aggregation solution to the PDCP PDU Duplication process.

Figure 15:
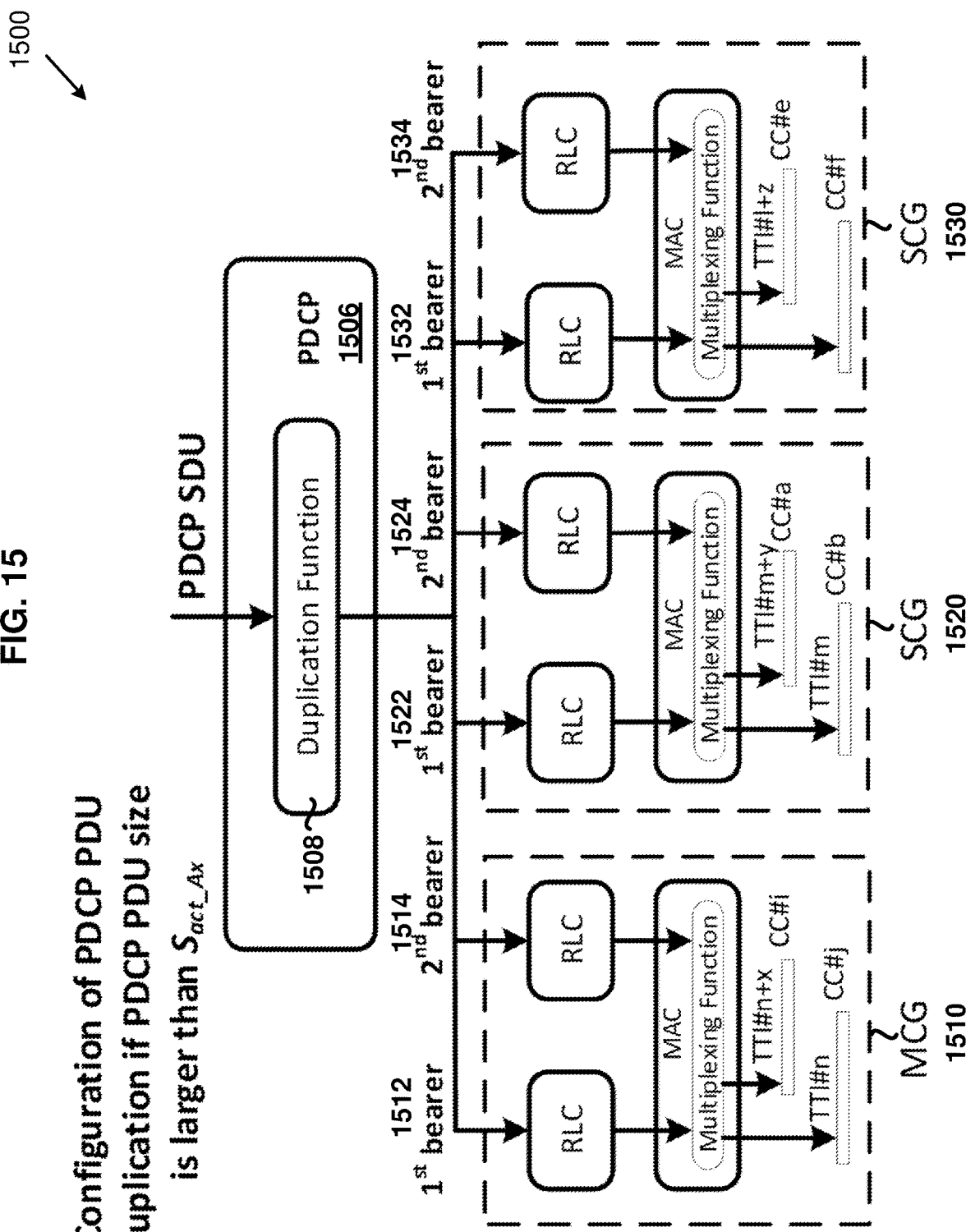
FIG. 15 is a schematic diagram illustrating an exemplary Duplication configuration, according to an exemplary implementation of the present application.

In FIG. 15, under Config.x2, when the PDCP PDU size of the pending PDCP PDU is greater than (or equal to) the PDCP PDU size threshold, $S_{act\_Ax}$, a duplication function 1508 in a PDCP layer 1506 may duplicate the PDCP PDU and provide the duplicated PDCP PDU(s) to one or more bearers (e.g., 1512 and/or 1514) in a MCG 1510, one or more bearers (e.g., 1522 and/or 1524) in a SCG 1520, and one or more bearers (e.g., 1532 and/or 1534) in a SCG 1530. After multiplexing in the MAC layers of the corresponding MCG 1510, SCG 1520, and SCG 1530, the duplicated packets are sent through multiple component carriers of the multiple cell groups. These duplicated bearers may be configured with the configuration of DRBs or SRBs. The present implementation provides a multi-connectivity solution to the Duplication process. In the present implementation, the Duplication with multi-connectivity is supported in both control plane and user plane transmissions.

Figure 16:
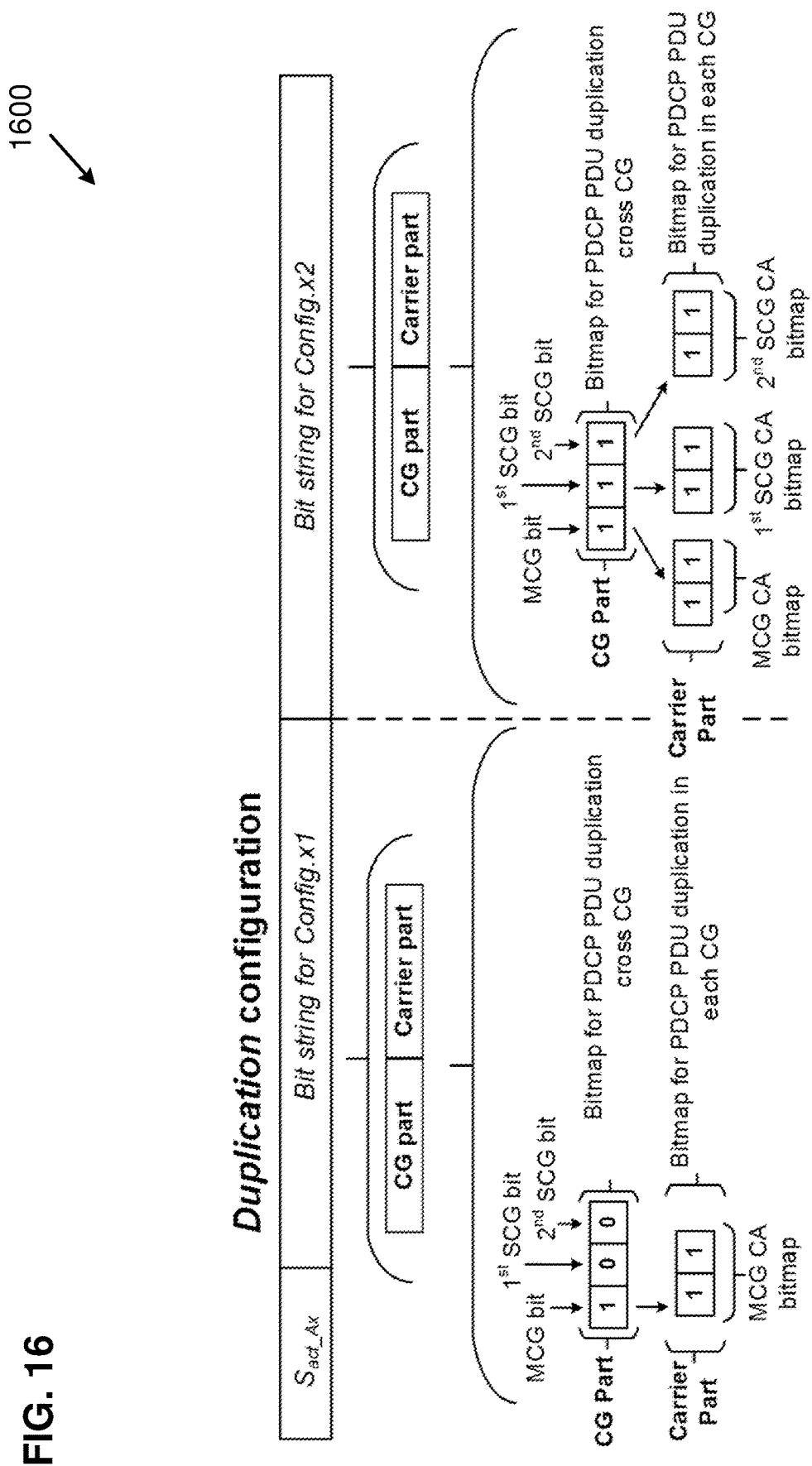
FIG. 16 is a diagram illustrating an exemplary Duplication configuration in the downlink control signaling, according to an exemplary implementation of the present application.

FIG. 16 is a diagram illustrating an exemplary Duplication configuration in the DL control signaling, according to an exemplary implementation of the present application. In the present implementation, Duplication configuration of one data flow configuration under multi-connectivity is provided, similar to FIG. 2. Then, the value of $S_{act\_Ax}$ and two bit strings for Config.x1 and Config.x2 are provided respectively in the Duplication configuration. Each bitmap can be further divided into two parts: cell group (CG) part and Carrier Part. In the CG part, a bitmap is provided to indicate whether PDCP PDU Duplication is applied to each CG.

Under Configuration #1 (e.g., Config.x1), the first bit in the CG Part (e.g., MCG bit) is set to "1", if at least one duplicated bearer for PDCP PDU Duplication is applied to the MCG. Then, the second bit and the third bit in the CG part, which represent the first SCG and second SCG, respectively, are set to "0" because there is no duplicated bearer to the first SCG and second SCG in Configuration #1 (e.g., Config.x1). Following the CG part, the Carrier part bitmap may be set based on the result of CG part. Taking the MCG for example, 2 bits are provided in the MCG CA bitmap because there are two split bearers in the MCG (as shown in FIG. 14). Each bit in the MCG CA bitmap corresponds to a split bearer in the data flow configuration. Based on the Configuration #1 (e.g., Config.x1), the first bit (e.g., for the duplicated bearer 1414 in the first bearer of the MCG 1410 in FIG. 14) and the $2^{nd}$ bit (e.g., for the original bearer 1412 in the second bearer in of the MCG 1410 in FIG. 14) in the MCG CA bitmap are set to "1" to reflect the Duplication configuration. Thus, under Configuration #1 (e.g., Config.x1), there is no Carrier part for the first SCG and second SCG.

Under Configuration #2 (e.g., Config.x2), the first bit in the CG Part (e.g., MCG bit) is set to "1", if at least one duplicated bearer for PDCP PDU Duplication is applied to the MCG. Then, the second bit and the third bit in the CG part, which represent the first SCG and second SCG, respectively, are set to "1" because there are duplicated bearers to first SCG and second SCG in Configuration #2 (e.g., Config.x2) (as shown in FIG. 15). Following the CG part, the Carrier part bitmap may be set based on result of CG part. Taking the MCG for example, 2 bits are provided in the MCG CA bitmap because there are two split bearers in the MCG (as shown in FIG. 15). Each bit in the MCG CA bitmap corresponds to a split bearer in the data flow configuration. For the carrier part, 2 bits are provided in each of the first SCG and second SCG CA bitmaps, because there are two split bearers in the first SCG and two split bearers in the second SCG CA (as shown in FIG. 15). Each bit in the first SCG and second SCG CA bitmaps corresponds to a split bearer in the data flow configuration, and is set to "1" to reflect the Duplication configuration.

FIG. 17 is a diagram illustrating an exemplary Duplication configuration in the DL control signaling, according to an exemplary implementation of the present application. As shown in FIG. 17, in the Duplication configuration, each cell group (CG) is indexed (e.g., CG index, such as MCG is '0', SCG #1 is '1' and SCG #2 is '2') by the base station (e.g., gNB). In addition, the component carrier (CC) in each CG is also indexed (e.g., CC index, such as the $1^{st}$ bearer in SCG #1 is "0" and the $2^{nd}$ bearer in SCG #1 is "1"). As shown in FIG. 17, the Duplication configuration of E #A-Config.x1 is provided with the index of 1" duplicated bearer (CG index=00 and CC index=00, which are presented in the binary bits). Based on the same rule, the Duplication configuration of E #A-Config.x2 is provided in FIG. 17 with the {CG index, CC index} of 5 duplicated bearers respectively.

According to implementations of the application, a Duplication configuration may include the following information:

(a) Duplicated bearer indication:
  Two duplicated bearer indication approaches are provided in FIGS. 16 and 17.
(b) Minimum activation period ($T_{Dup\_act}$) for Duplication:
  To prevent frequent activation and/or deactivation of Duplication, for example, in a short time period, the base station may provide a minimum activation period, during which the UE may not deactivate Duplication, to the UE in the Duplication configuration. The minimum activation period indicates the minimum time period that the Duplication needs to last (i.e., keep activated) after an activation event for Duplication. As such, the UE may not deactivate Duplication during the minimum activation period ($T_{Dup\_act}$) after the UE activates Duplication, even if all the configured deactivation events are fulfilled during $T_{Dup\_act}$. In other implementations, the minimum activation period ($T_{Dup\_act}$) may be provided by the core network, by RAN, or may be a fixed value in the technical specifications.
(c) Semi-persistent scheduling (SPS) configuration (Configured Grant) in uplink:
  Base station (e.g., a gNB) configures semi-persistent scheduling UL Grant(s) (a.k.a. Configured Grant) to a UE. The Configured Grant would appear (periodically) in the uplink direction and UE could deliver UL packets on the Configured Grant without further requesting dynamic UL grant to the serving cells.
  The base station may allocate more than one Configured Grant configuration to the UE. In addition, the base station may separate the Configured Grant configuration(s) to each radio bearer (DRB or SRB) and so the packets among different radio bearer would be delivered separately on different Configured Grant(s).
  One Configured Grant configuration may include the radio resource allocation. In some implementations, the radio resource allocation may include:
  (1) Component Carrier ID;
  (2) Time/frequency resource allocation of physical radio blocks on the configured component carrier, which may appear periodically;
  (3) Code/power/spatial domain resources;
  (4) Hopping mechanism among radio resources;
  (5) Demodulation-Reference signal configuration.

It is noted that, in some embodiments, the Configured Grant configuration may be de-activated when Duplication is deactivated. Meanwhile, when Duplication is re-activated, the Configured Grant will be resumed and the base station shall reserve those UL resources for relative operation for the UE.

The physical resource of one Configured Grant configuration to a UE may be shared by more than one UE. The base station may decide which UEs may share the Configured Grant. The UE may firstly transmit TB (and/or repeated TBs) through the Configured Grant, and wait for the response from the base station. Once the TB transmission on the Configured Grant fails (e.g. the UE receives a NACK message or no response from the base station), the UE may require dedicated UL resource (e.g. through scheduling request and/or Buffer Status Report) to request additional radio resource to transmit the TB.

(d) RLC segmentation size for RLC PDU pre-processing:

In the RLC layer, the UE may segment one RLC SDU into several RLC PDUs. The RLC segmentation size may influence the latency of PDCP SDU reception since the RLC segmentation may affect the TB size in the physical (PHY) layer. The base station may configure the RLC segmentation size. So, the UE can segment the RLC SDU to multiple RLC PDUs in advance. In some implementations, the segmentation in the RLC layer may be disabled, such that the value of RLC segmentation size may be set to a very large value (e.g., infinite) to express RLC segmentation is disabled. In some implementations, the RLC segmentation may be disabled when the PDCP PDU size is small (e.g., E #C-3 in Table 1-3).

According to implementations of the application, a Repetition configuration may include the following information:

(a) Maximum times of TB Repetition (K):

The maximum times that the UE could repeat for a TB. In some implementations, the base station may indicate different maximum times of TB Repetition in different conditions, as shown in Table 4 below. The base station may provide the $S_{Rep\_y1}$ during the Repetition configuration.

TABLE 4

Conditional Maximum Numbers of TB Repetition
Conditional Maximum Numbers of TB Repetition

| | |
|---|---|
| Condition#1 | Maximum times of TB repetition ($K_1$) if the TB size ≥ $S_{Rep\_y1}$ |
| Condition#2 | Maximum times of TB repetition ($K_2$) if the TB size < $S_{Rep\_y1}$ |

(b) Power ramping configuration:

The UE is allowed to gradually increase the transmission power as the UE transmits the $1^{st}$ repeated TB, $2^{nd}$ repeated TB, $3^{rd}$ repeated TB, and so on.

(c) Minimum activation period ($T_{Rep\_act}$) for Repetition:

To prevent frequent activation and/or deactivation of Repetition, for example, in a short time period, the base station may provide a minimum activation period, during which the UE may not deactivate Repetition, to the UE in the Repetition configuration. The minimum activation period indicates the minimum time period that the Repetition needs to last (i.e., keep activated) after an activation event for Repetition. As such, the UE may not deactivate Repetition during the minimum activation period ($T_{Rep\_act}$) after the UE activates Repetition, even if all the configured deactivation events are fulfilled during $T_{Rep\_act}$. In other implementations, the minimum activation period ($T_{Rep\_act}$) may be provided by the core network, or may be a fixed value in the technical specifications.

(d) Semi-persistent scheduling (SPS) configuration (Configured Grant) in uplink:

Base station (e.g., a gNB) configures semi-persistent scheduling UL Grant(s) (a.k.a. Configured Grant) to a UE. The Configured Grant would appear (periodically) in the uplink direction and UE could deliver UL packets on the Configured Grant without further requesting dynamic UL grant to the serving cells.

One Configured Grant configuration may include the radio resource allocation. In some implementations, the radio resource allocation may include:

(1) Component Carrier ID;
(2) Time/frequency resource allocation of physical radio blocks on the configured component carrier, which may appear periodically;
(3) Code/power/spatial domain resources;
(4) Hopping mechanism among radio resources;
(5) Demodulation-Reference signal configuration.

It is noted that, in some embodiments, the Configured Grant configuration may be de-activated when Repetition is deactivated. Meanwhile, when Repetition is re-activated, the Configured Grant will be resumed and the base station shall reserve those UL resources for relative operation for the UE.

The physical resource of one Configured Grant configuration to a UE may be shared by more than one UE. The base station may decide which UEs may share the Configured Grant. The UE may transmit (repeated) TBs through the Configured Grant, and wait for the response from the base station. Once the (repeated) TB transmission on the Configured Grant fails (e.g. the UE receives all NACK messages or there is no response from the base station after transmitting repeated TBs reaching to the maximum times of TB Repetition), the UE may require dedicated UL resource (e.g. through scheduling request and/or Buffer Status Report) to request additional radio resource to transmit the (repeated) TB(s).

Figure 18:
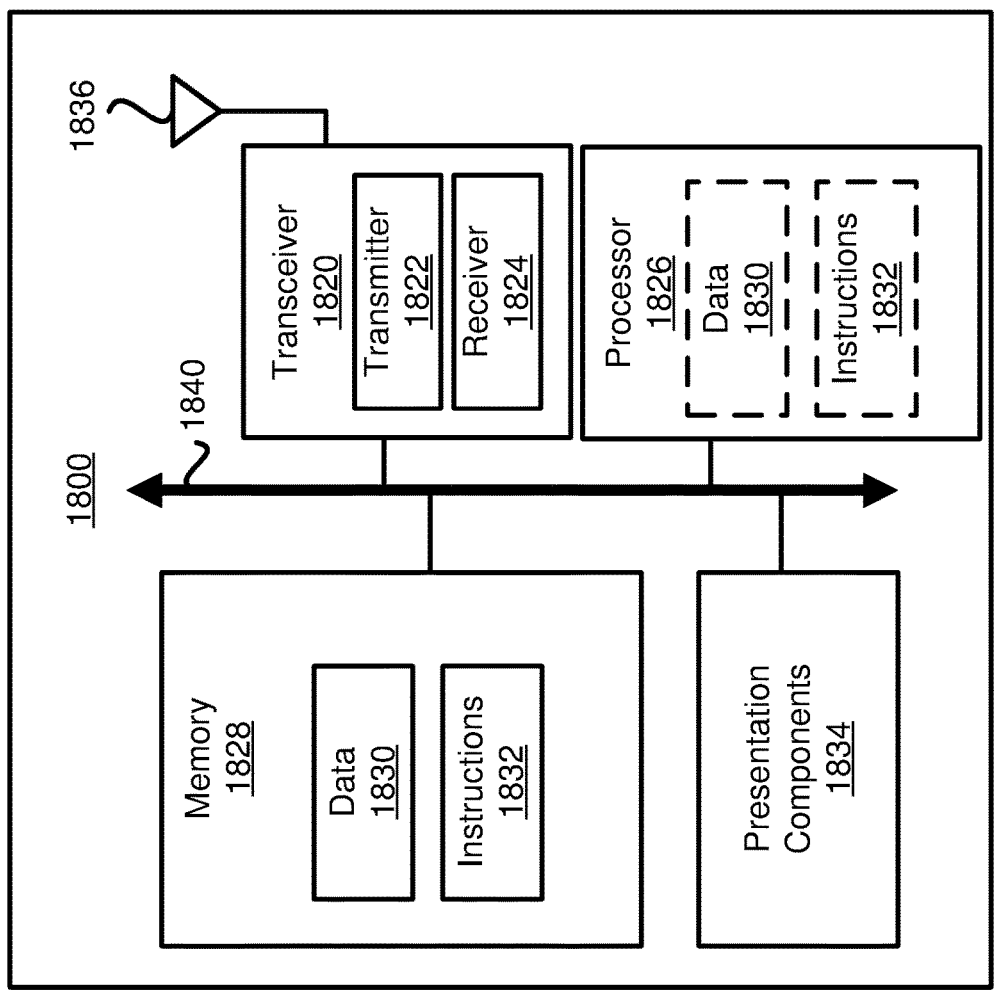
FIG. 18 is a block diagram illustrating a radio communication equipment, in accordance with an exemplary implementation of the present application.

FIG. 18 illustrates a block diagram of a node for wireless communication, in accordance with various aspects of the present application. As shown in FIG. 18, node 1800 may include a transceiver 1820, a processor 1826, a memory 1828, one or more presentation components 1834, and at least one antenna 1836. The node 1800 may also include an RF spectrum band module, a base station communications module, a network communications module, and a system communications management module, input/output (I/O) ports, I/O components, and power supply (not explicitly shown in FIG. 18). Each of these components may be in communication with each other, directly or indirectly, over one or more buses 1840.

The transceiver 1820 having a transmitter 1822 and a receiver 1824 may be configured to transmit and/or receive time and/or frequency resource partitioning information. In some implementations, the transceiver 1820 may be configured to transmit in different types of subframes and slots including, but not limited to, usable, non-usable and flexibly usable subframes and slot formats. The transceiver 1820 may be configured to receive data and control channels.

The node 1800 may include a variety of computer-readable media. Computer-readable media can be any available media that can be accessed by the node 1800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1828 may include computer-storage media in the form of volatile and/or non-volatile memory. The memory 1828 may be removable, non-removable, or a combination thereof. Exemplary memory includes solid-state memory, hard drives, optical-disc drives, and etc. As illustrated in FIG. 18, The memory 1828 may store computer-readable, computer-executable instructions 1832 (e.g., software codes) that are configured to, when executed, cause the processor 1826 to perform various functions described herein, for example, with reference to FIGS. 1 through 17. Alternatively, the instructions 1832 may not be directly executable by the processor 1826 but be configured to cause the node 1800 (e.g., when compiled and executed) to perform various functions described herein.

The processor 1826 may include an intelligent hardware device, e.g., a central processing unit (CPU), a microcontroller, an ASIC, and etc. The processor 1826 may include memory. The processor 1826 may process the data 1830 and the instructions 1832 received from the memory 1828, and information through the transceiver 1820, the base band communications module, and/or the network communications module. The processor 1826 may also process information to be sent to the transceiver 1820 for transmission through the antenna 1836, to the network communications module for transmission to a core network.

One or more presentation components 1834 presents data indications to a person or other device. Exemplary presentation components 1834 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

APPENDIX A

| Duplication Configurations: | |
|---|---|
| E#A-1 | |
| $T_{act\_A1}$ | (A) Unit: Bytes<br>(B) gNB would indicate one value among a group of values, which are defined in technical specification. E.g. {b100, b200, b400, b800} are defined in the Specification. Here, b100 represents 100 byte, b200 represents 200 bytes, and so on. |
| E#A-2 | |
| $T_{act\_A2}$ | (A) Unit: Millisecond<br>gNB would indicate one value among a group of values, which are defined in technical specification. E.g. {ms1, ms2, ms3} ms1 represents 1 ms, ms2 represents 2 ms and so on.<br>(A) Unit: Symbol (or transmission time interval, TTI)<br>(B) gNB may indicate an exact value for the symbols (TTI) that the Tx should wait (e.g. $T_{act\_A2}$ = 3 symbols).<br>(C) The length of symbol (TTI) in time domain may be a fixed value or be configured by gNB through broadcasting or dedicated signaling. |
| E#A-2A | |
| $S_{act\_A2}$ | gNB would indicate an exact value to $S_{act\_A2}$ (e.g. $S_{act\_A2}$ = 2) |
| E#A-3 | |
| $S_{act\_A3}$ | Bytes (refer to $T_{act\_A1}$) |
| E#DA-1 | |
| $T_{De\text{-}act\_A1}$<br>$W_{De\text{-}act\_A1}$ | Bytes (refer to $T_{act\_A1}$)<br>Unit: Millisecond<br>gNB would indicate one value among a group of values, which are defined in technical specification. E.g. {ms1, ms2, ms3} ms1 represents 1 ms, ms2 represents 2 ms, and so on. |

APPENDIX A-continued

| | |
|---|---|
| | (A) Unit: Subframe<br>(B) gNB would indicate one value among a group of values, which are defined in technical specification. E.g. {sf8, sf16, sf32} are defined in the Specification. Here, sf8 represents 8 subframes, sf16 represents 16 subframes, and so on. The length of subframe in time domain may be a fixed value or be configured by gNB.<br>E#DA-2 |
| $N_{De\text{-}act\_A2}$<br>$T_{De\text{-}act\_A2}$<br>$W_{De\text{-}act\_A2}$ | gNB would indicate an exact value to $N_{De\text{-}act\_A2}$ (e.g. $N_{De\text{-}act\_A2} = 10$)<br>Unit: symbols (refer to $T_{act\_A2}$)<br>Unit: Millisecond (refer to $W_{De\text{-}act\_A1}$) (e.g., 100 ms)<br>Unit: subframe (refer to $W_{De\text{-}act\_A1}$)<br>E#DA-3 |
| $S_{act\_A3}$ | Bytes (refer to $T_{act\_A1}$)<br>Other parameters in Duplication Configuration |
| $T_{Dup\_act}$<br><br>RLC segmentation size | Unit: Millisecond (refer to $W_{De\text{-}act\_A1}$)<br>Unit: subframe (refer to $W_{De\text{-}act\_A1}$)<br>Bytes (refer to $T_{act\_A1}$) |
| Repetition Configurations: | |
| | E#C-1 |
| $S_{act\_C1}$ | Unit: dBm<br>(A) gNB would indicate one value among a group of values, which are defined in technical specification. E.g. {dBm-120, dBm-110, dBm-100} are defined in the Specification. Here, dBm-120 represents −120 dBm, b-110 represents −110 dBm, and so on.<br>(B) gNB would also indicate the type for channel measurement (e.g. RSRP/RSRQ/RSSI)<br>E#C-2 |
| $N_{act\_C2}$<br>$S_{act\_C2}$ | gNB would indicate an exact value to $N_{act\_C2}$ (e.g. $N_{act\_C2} = 10$)<br>eNB would indicate one value among a group of values, which are defined in technical specification. E.g. {r01, r02, r03} are defined in the Specification. Here, r01 represents 0.1, r02 represents 0.2, and so on.<br>E#C-2A |
| $S'_{act\_C2}$ | gNB would indicate an exact value to $S'_{act\_C2}$ (e.g. $S'_{act\_C2} = 2$)<br>E#C-3 |
| $S_{act\_C3}$ | Bytes (refer to $T_{act\_A1}$)<br>E#DC-1 |
| $S_{De\text{-}act\_C1}$<br>$T_{De\text{-}act\_C1}$ | dBm (refer to $S_{act\_C1}$)<br>Unit: Millisecond (refer to $W_{De\text{-}act\_A1}$)<br>Unit: Subframe (refer to $W_{De\text{-}act\_A1}$)<br>E#DC-2 |
| $N_{De\text{-}act\_C2}$<br>$S_{De\text{-}act\_C2}$ | gNB would indicate an exact value to $N_{De\text{-}act\_C2}$ (e.g. $N_{De\text{-}act\_C2} = 30$)<br>$1 > S_{De\text{-}act\_C2} > 0$ (refer to $S_{act\_C2}$)<br>E#DC-3 |
| $S_{De\text{-}act\_C3}$ | Bytes (refer to $T_{act\_A1}$) (e.g., 200 Kbytes)<br>Other parameters in Repetition Configuration |
| Maximum times of TB repetition (K) | gNB would indicate an exact value to K (e.g. K = 5) |
| Power ramping configuration | Unit: dB<br>gNB would indicate one value among a group of values, which are defined in technical specification. E.g. {dB3, dB5, dB6} are defined in the Specification. Here, dB3 represents 3 dB increase for each repeated TB transmission, dB5 represents 5 dB increase for each repeated TB transmission, and so on. |
| Activation period ($T_{Rep\_act}$) for Repetition | Unit: Millisecond (refer to $W_{De\text{-}act\_A1}$)<br>Unit: subframe (refer to $W_{De\text{-}act\_A1}$)<br>Conditional maximum numbers of TB repetition |
| $\{K_1, K_2\}$<br>$S_{Rep\_y1}$ | gNB would indicate an exact value to $\{K_1, K_2\}$ (e.g. $K_1 = 0$, $K_2 = 4$).<br>Bytes (refer to $T_{act\_A1}$) |

The invention claimed is:

1. A method for packet data convergence protocol (PDCP) protocol data unit (PDU) duplication for a radio bearer of a user equipment (UE), the method comprising:

receiving, from a serving radio access network (RAN), through radio resource control (RRC) signaling, a PDCP PDU duplication configuration and a first bitmap, the PDCP PDU duplication configuration for configuring at least two split bearers associated with a cell group, each split bearer having a one-on-one relationship with one radio link control (RLC) entity of the UE, each bit in the first bitmap for indicating whether a corresponding one of the at least two split bearers is active or inactive for transmitting duplicated PDCP PDUs to the serving RAN; and receiving, from the serving RAN, a medium access control (MAC) control element (CE) for reconfiguring the at least two split bearers, the MAC CE comprising a second bitmap, each bit in the second bitmap also for indicating whether a corresponding one of the at least two split bearers is active or inactive for transmitting the duplicated PDCP PDUs to the serving RAN.

2. The method of claim 1, wherein the cell group comprises one of a master cell group (MCG) and a secondary cell group (SCG).

3. The method of claim 1, wherein:
receiving the MAC CE from the serving RAN comprises receiving the MAC CE from a serving base station associated with the serving RAN, and
the serving base station comprises one of a master base station and a secondary base station.

4. The method of claim 1, further comprising delivering the duplicated PDCP PDUs to the serving RAN through each active split bearer that has a corresponding bit in the second bitmap set to one.

5. The method of claim 1, further comprising not delivering the duplicated PDCP PDUs to the serving RAN through each inactive split bearer that has a corresponding bit in the second bitmap set to zero.

6. The method of claim 1, further comprising deactivating the PDCP PDU duplication configuration associated with the radio bearer when all of the bits in the second bitmap are set to zero.

7. A user equipment (UE), comprising:
one or more processors; and
one or more non-transitory computer-readable media coupled with the one or more processors, having instructions embodied thereon, which, when executed by at least one of the one or more processors, cause the UE to:
receive, from a serving radio access network (RAN), through dedicated control radio resource control (RRC) signaling, a packet data convergence protocol (PDCP) protocol data unit (PDU) duplication configuration and a first bitmap, the PDCP PDU duplication configuration for configuring at least two split bearers associated with a cell group, each split bearer having a one-on-one relationship with one radio link control (RLC) entity of the UE, each bit in the first bitmap for indicating whether a corresponding one of the at least two split bearers is active or inactive for transmitting duplicated PDCP PDUs to the serving RAN; and receiving, from the serving RAN, a medium access control (MAC) control element (CE) for reconfiguring the at least two split bearers, the MAC CE comprising a second bitmap, each bit in the second bitmap also for indicating whether a corresponding one of the at least two split bearers is active or inactive for transmitting the duplicated PDCP PDUs to the serving RAN.

8. The UE of claim 7, wherein the cell group comprises one of a master cell group (MCG) and a secondary cell group (SCG).

9. The UE of claim 7, wherein:
receiving the MAC CE from the serving RAN comprises receiving the MAC CE from a serving base station associated with the serving RAN, and
the serving base station comprises one of a master base station and a secondary base station.

10. The UE of claim 7, wherein the instructions, when executed by the at least one processor, further cause the UE to deliver the duplicated PDCP PDUs to the serving RAN through each active split bearer that has a corresponding bit in the second bitmap set to one.

11. The UE of claim 7, wherein the instructions, when executed by the at least one processor, further cause the UE to not deliver the duplicated PDCP PDUs to the serving RAN through each inactive split bearer that has a corresponding bit in the second bitmap set to zero.

12. The UE of claim 7, wherein the instructions, when executed by the at least one processor, further cause the UE to deactivate the PDCP PDU duplication configuration associated with the radio bearer when all of the bits in the second bitmap are set to zero.

13. The method of claim 1, wherein receiving the PDCP PDU duplication configuration through the RRC signaling from the serving RAN comprises receiving the RRC signaling from a serving base station, the serving base station being one of a master base station and a secondary base station.

14. The method of claim 1, wherein
the second bitmap received through the MAC CE is prioritized over the first bitmap received through the RRC signaling.

15. The UE of claim 7, wherein receiving the PDCP PDU duplication configuration through the RRC signaling from the serving RAN comprises receiving the RRC signaling from a serving base station, the serving base station being one of a master base station and a secondary base station.

16. The UE of claim 7, wherein the
second bitmap received through the MAC CE is prioritized over the first bitmap received through the RRC signaling.

* * * * *